United States Patent [19]
Yamazaki et al.

[11] Patent Number: 4,737,945
[45] Date of Patent: Apr. 12, 1988

[54] MULTI-DISK PLAYER

[75] Inventors: Youichi Yamazaki; Kimihiro Yoshitake; Shogo Takeuchi; Akira Takahashi; Nobumitsu Tomita, all of Saitama, Japan

[73] Assignee: Pioneer Electronic Corporation, Tokyo, Japan

[21] Appl. No.: 894,521

[22] Filed: Aug. 8, 1986

[30] Foreign Application Priority Data

Aug. 8, 1985 [JP] Japan .................. 60-175439

[51] Int. Cl.$^4$ .......................... G11B 17/22
[52] U.S. Cl. ...................... 369/36; 369/270
[58] Field of Search .............. 369/36, 38, 39, 270

[56] References Cited

U.S. PATENT DOCUMENTS

| 3,246,899 | 4/1966 | Bodentodet | 369/39 |
|---|---|---|---|
| 4,170,030 | 10/1979 | Castrodale et al. | 369/38 |
| 4,538,253 | 8/1985 | Ishihashi et al. | 369/36 |
| 4,561,078 | 12/1985 | Nakayama | 369/36 |
| 4,610,008 | 9/1986 | Ishibashi et al. | 369/39 |
| 4,633,452 | 12/1986 | Shimbo et al. | 369/36 |
| 4,653,037 | 3/1987 | Nakayama et al. | 369/38 |

FOREIGN PATENT DOCUMENTS 63767  4/1985  Japan .................. 369/36

OTHER PUBLICATIONS

Now, the Compact Disc Jukebox, Advertising Brochure from Pioneer.
New Product Announcement, Advertising Brochure from Technics.

Primary Examiner—Steven L. Stephan
Attorney, Agent, or Firm—Sughrue, Mion, Zinn, Macpeak, and Seas

[57] ABSTRACT

A multi-disk player is disclosed which comprises a housing, a play-back means provided with a turntable and disposed in said housing, a magazine arranged to be demountably mounted in said housing at a predetermined mounting portion and for accommodating and arranging a plurality of disks one by one, a disk conveying mechanism for selecting desired ones of said disks in said magazine one by one, and for conveying the selected disks onto said disk carrying surface one by one from said magazine and conveying into said magazine one by one from said disk carrying surface, and a clamp mechanism for clamping the disk conveyed on said turntable. The clamp mechanism includes a pressing member arranged to come into contact with one surface of the disk mounted on the turntable at the other surface of the disk to perform a disk clamping operation in cooperation with the turntable, and a support arm arranged to be movable relative to the turntable between a clamping position and a non-clamping position and for rotatably supporting the pressing member. The supporting arm is movable along a plane parallel to the disk carrying surface.

3 Claims, 23 Drawing Sheets

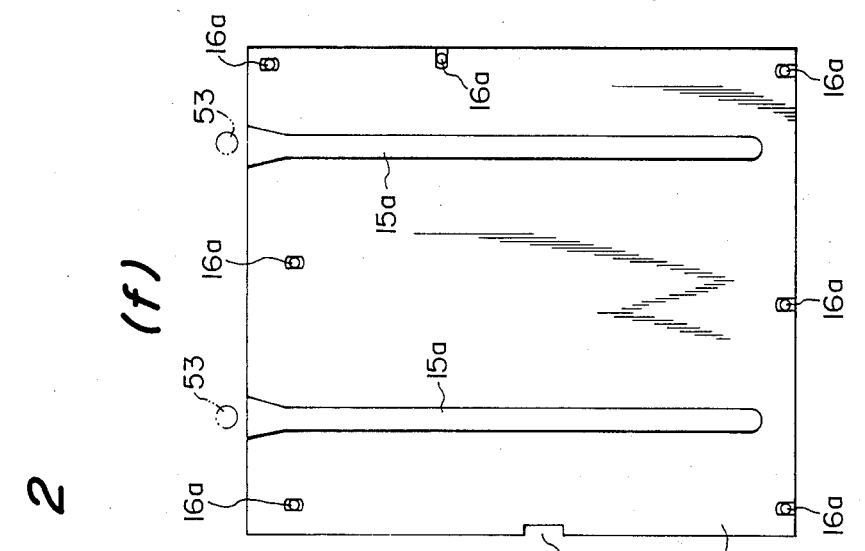
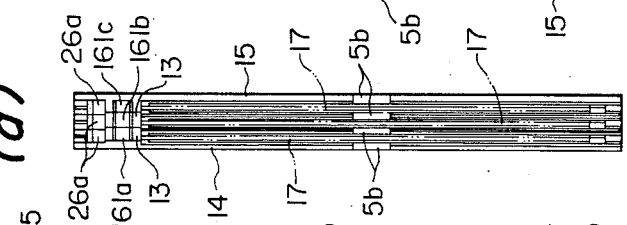
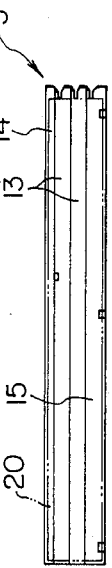
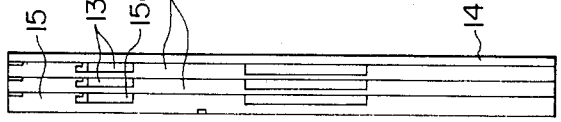
FIG. 2

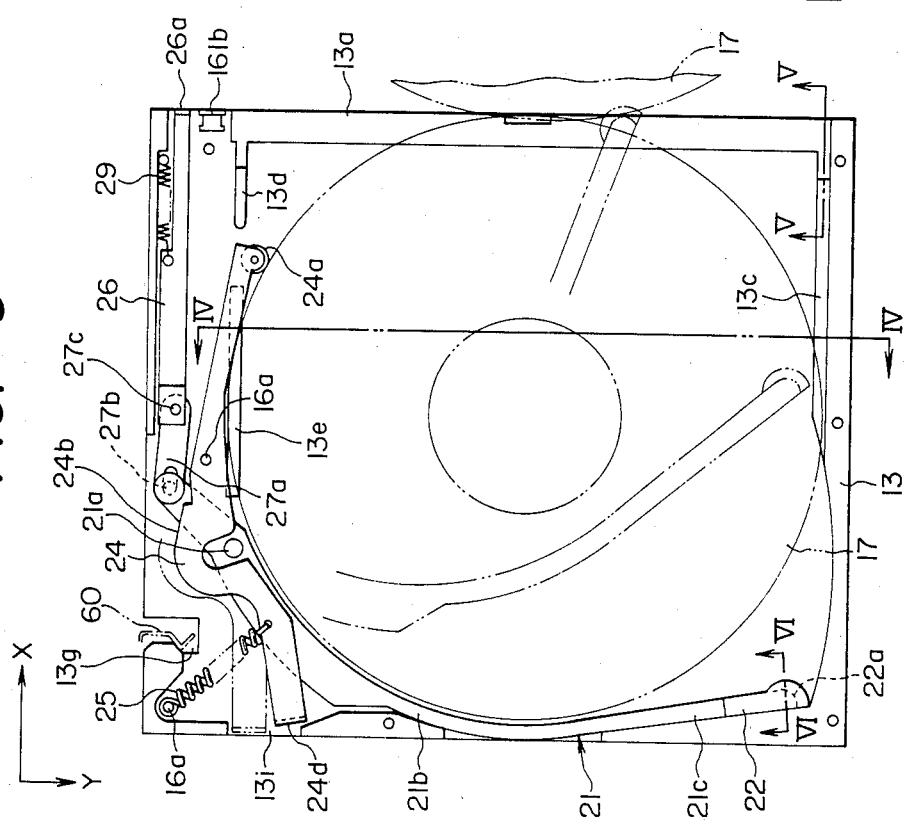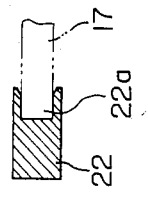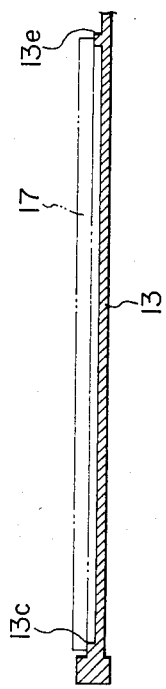

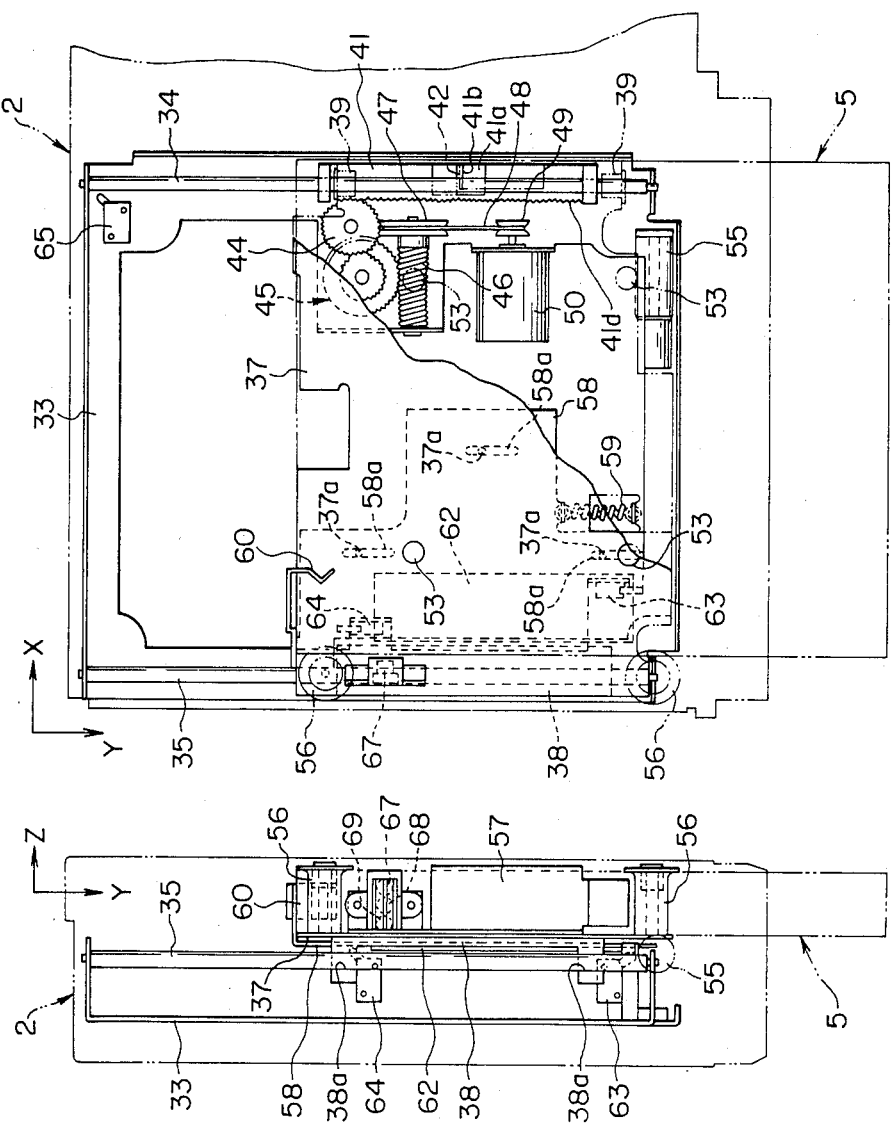
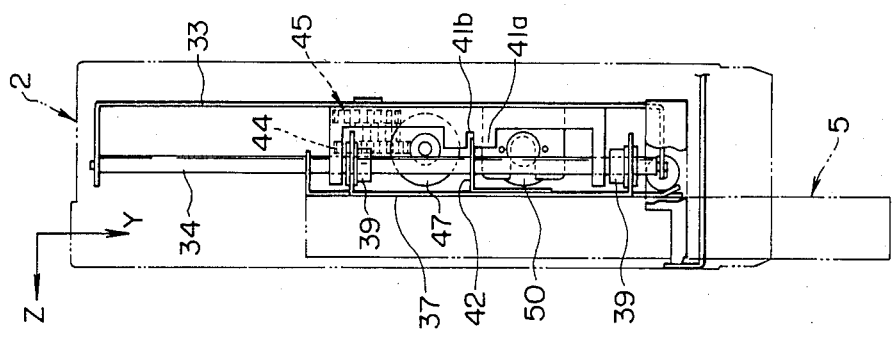

FIG. 17
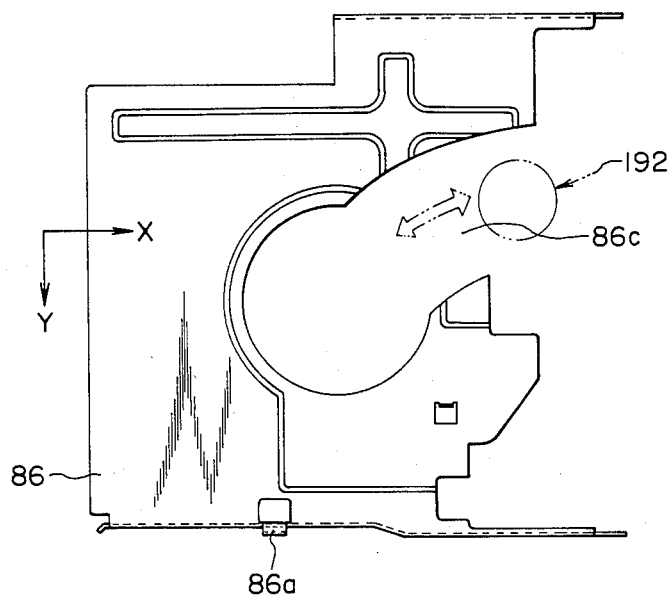
FIG. 18
(a)
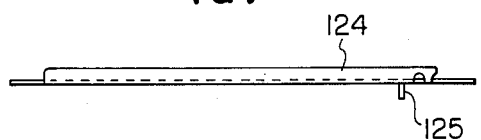
(b)
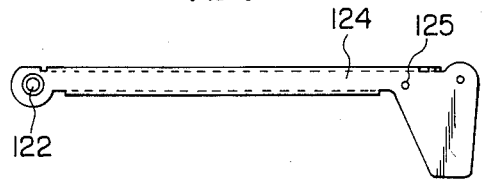

FIG. 19
(a)
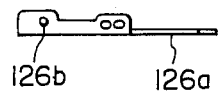
(b)
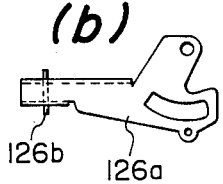
(c)
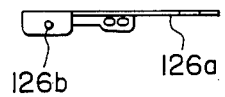
FIG. 20
(a)
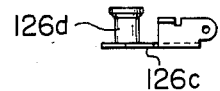
(b)
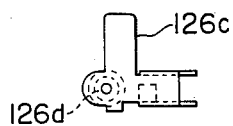
(c)
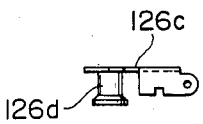
FIG. 21
(a)
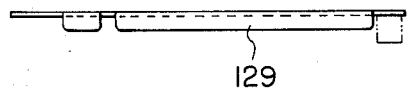
(b)

(b)  (a)

FIG. 25
(a)
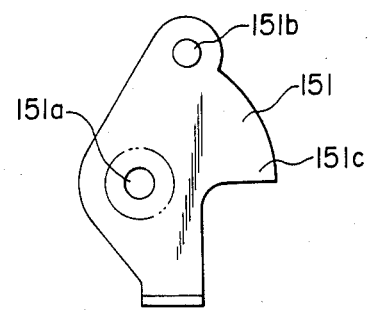
(b)
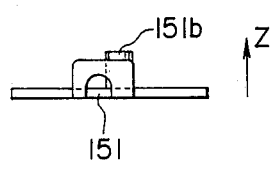
FIG. 26
(a)
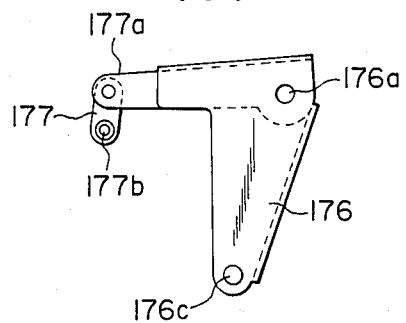
(b)
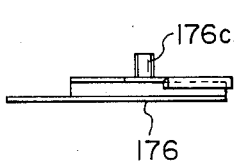
FIG. 27
(a)
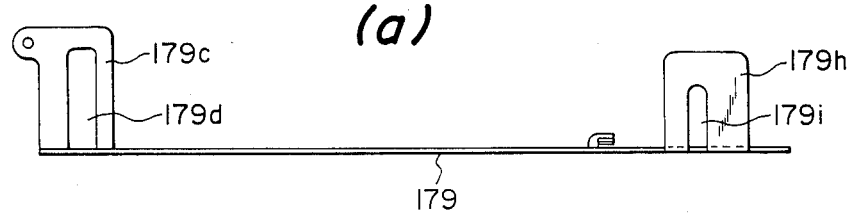
(b)
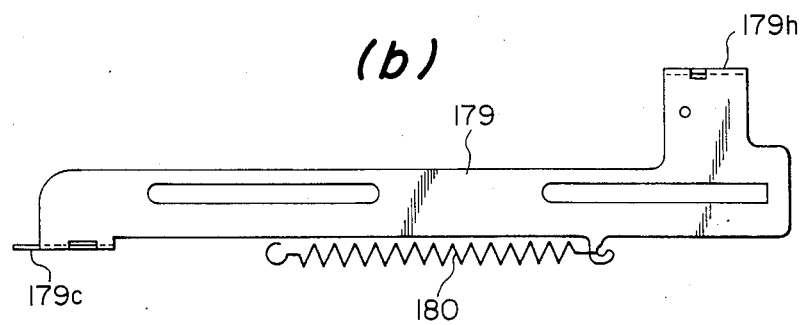

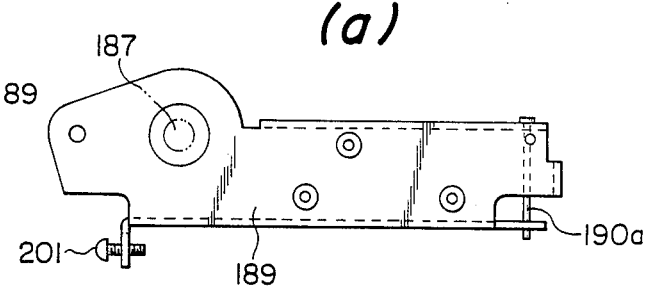
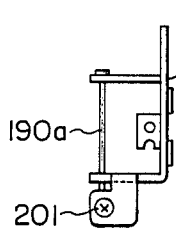
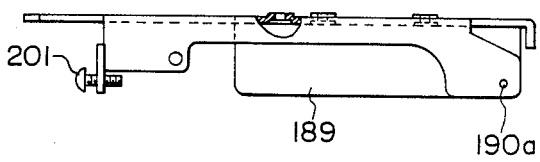
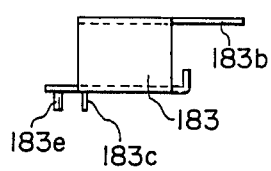
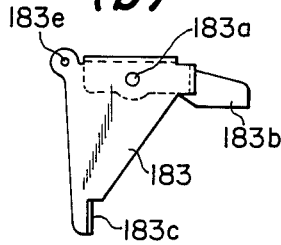
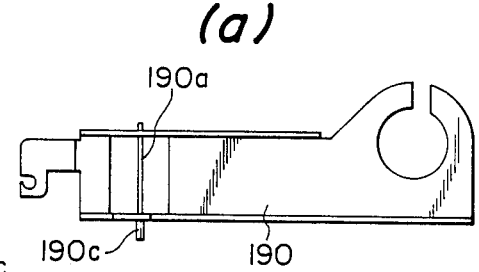
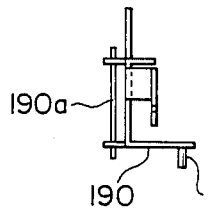
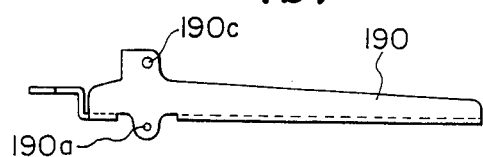

FIG. 31
(a)
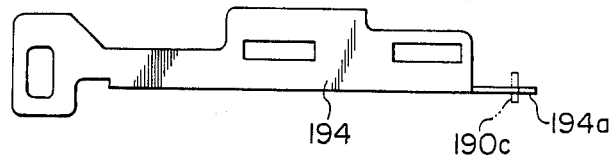
(b)
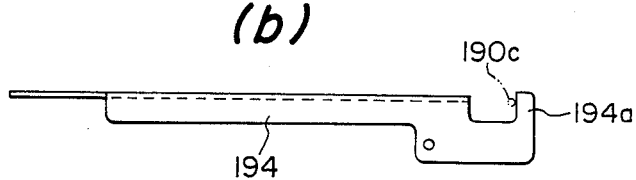
FIG. 32
(a)
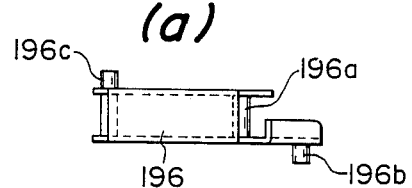
(c)
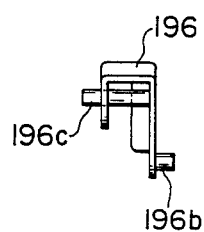
(b)
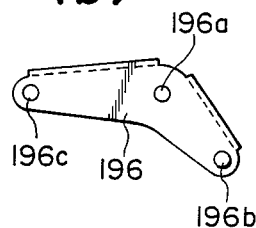

MULTI-DISK PLAYER

BACKGROUND OF THE INVENTION

The present invention relates to a disk player and particularly relates to a multi-disk player in which a plurality of disks can be accommodated and desired ones of the accommodated disks can be successively selected to perform continuous playback of the selected disks.

As the disk player in which a plurality of disks can be continuously played back, a jukebox has been generally known. The conventional jukebox, however, has not been suitable for domestic use, because of a very large bulk of a body per se of the jukebox.

Recently, there have been developed and practically used various kinds of disks, called digital audio disks (hereinafter abbreviated to "DAD"), in which digital signals are recorded so that not only the quantity of information to be stored can be increased but generation of noises can be suppressed in reproducing, in comparison with audio disks in which signals are stored in the analog mode. Of these DADs, a so-called compact disk of about 12 cm outer diameter and of the type in which signals are recorded into and read out of the disk by using a laser beam, is simple to deal with and able to reduce the size of the whole disk player. Recently, there has been developed a multi-disk player which is optimum as a jukebox for domestic use which can accommodate a plurality of compact DADs to perform continuous play-back of these DADs. By the way, such a compact DAD has a information storing capacity of one hour play-back which is about 1.5 times of that of the conventional analog audio disk. Accordingly, in three compact DADs, it is possible to store about 60 musics on the assumption that each music takes about 3 minutes for play back and therefore it is easy to include desired musics for every category, such as jazz, Enka (a kind of Japanese song), etc.

Basically, a multi-disk player comprises: play-back means including a turntable, a pickup, etc.; a magazine demountably mounted at a predetermined mounting position in a player housing and for arranging and accommodating a plurality disks one by one at a predetermined pitch; and a disk conveying mechanism for selecting desired ones of said disks in the magazine one by one, for conveying the selected disks one by one from the magazine onto a disk carrying surface of the turntable, and for conveying the selected disks one by one from the disk carrying surface into the magazine.

In the already developed multi-disk player, the mounting/demounting of the magazine into/from the player housing is performed manually by the listener by pushing/pulling the magazine into/out of the player housing. Accordingly, the player has given the listener troublesome feeing.

SUMMARY OF THE INVENTION

The present invention has been attained in view of the points as described above, and an object thereof is to provide a multi-disk player which has a good property of operation in mounting/demounting a magazine into/from a player housing and which is accurate in operation.

The multi-disk player, according to the present invention, comprises: a housing; a play-back means provided with a turntable and disposed in the housing; a magazine for carrying a plurality of disks so as to be able to move the disks along a main surface of each of the disks and for accommodating and arranging the disks one by one in the direction substantially perpendicular to a disk carrying surface of the turntable, the magazine being demountably mounted in the housing at a predetermined mounting portion; a magazone mounting/demounting mechanism for mounting/ejecting the magazine onto/from the mounting portion; a disk conveying mechanism for selecting desired ones of the disks in the magazine one by one, and for conveying the selected disks onto the disk carrying surface one by one from the magazine and conveying into the magazine one by one from the disk carrying surface; a control unit for controlling the play-back means, the magazine mounting/demounting mechanism, and the disk conveying mechanism; the disk conveying mechanism including disk projecting/accommodating means for projecting the disk along the main surface thereof toward the magazine to cause the magazine to accommodate the disk thereinto, and disk displacing means for displacing the disk in the direction perpendicular to the disk carrying surface and having a disk carrying portion arranged movable in the direction of arrangement of the disks in the magazine for carrying the disk projected from the magazine; and the control unit including ejecting means for generating a magazine ejection instruction in response to a manual ejection command even during play-back of disk, and confirmation means for making confirmation as to whether any other disk is being carried by the disk carrying portion when the disk is projected form the magazine to be conveyed onto the disk carrying portion and for making confirmation as to whether any accommodating portion for accommodating the other disk exists in the magazine.

BRIEF DESCRIPTION OF THE DRAWINGS

FIG. 2 are, in (a) through (f), a plan, an elevation, a left side view, a right side view, a rear elevation, and a bottom view, respectively, of the magazine;

FIG. 3 is a diagram showing the interior structure of the magazine;

FIGS. 4 through 6 are cross-sections along IV—IV line, V—V line, and VI—VI line, respectively, in FIG. 3;

FIGS. 7 through 9 are plan, a left side view, and a right side view, respectively, of the magazine mounting-/demounting mechanism;

FIGS. 17 through 32 are diagrams showing portions of the interior structure of the multi-disk player according to the present invention.

DESCRIPTION OF THE PREFERRED EMBODIMENTS

Figure 1:
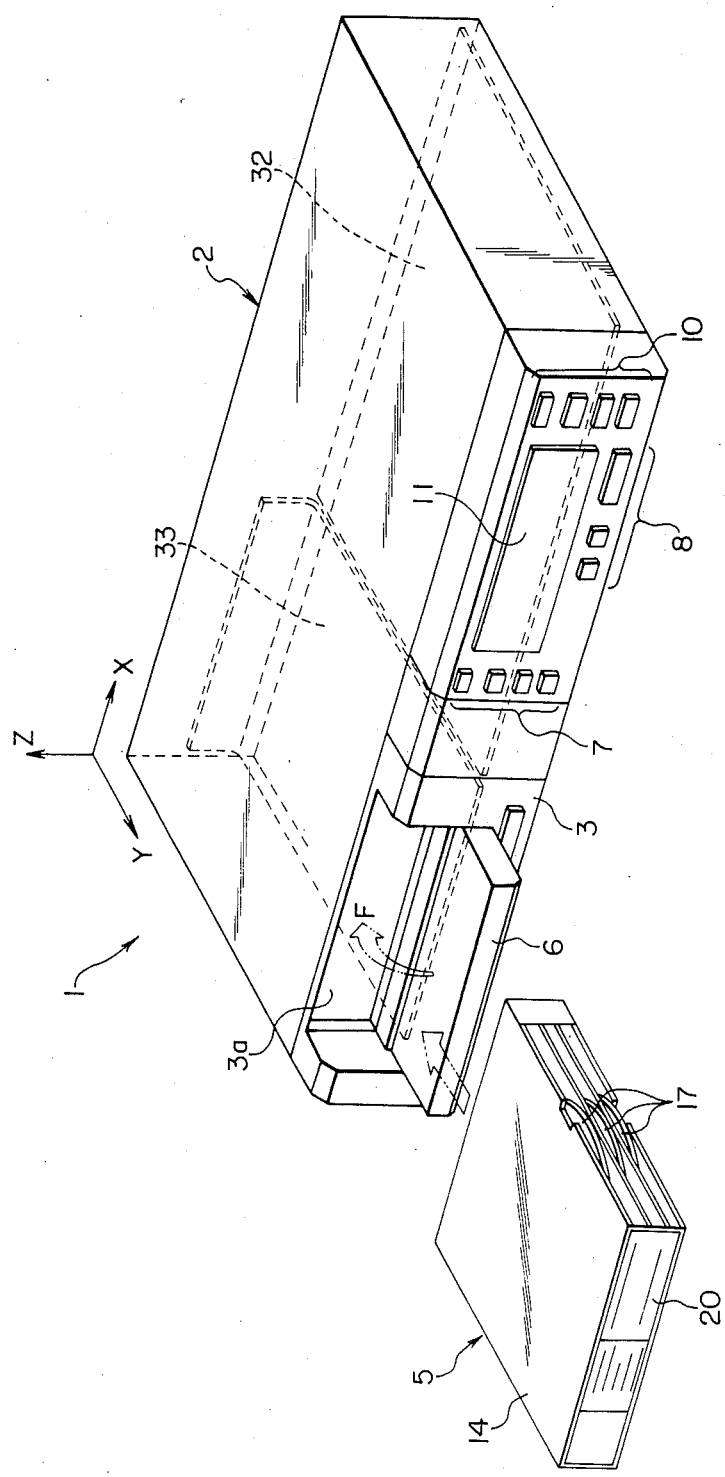
FIG. 1 is a perspective view of the whole of the multi-disk player according to the present invention.

Referring to accompanying drawings, an embodiment of the multi-disk player according to the present invention will be described hereunder.

In the drawings, the reference numeral 1 generally designates the multi-disk player. The multi-disk player 1 is for use on-vehicle and to be attached in a dash board or in a console box of a car.

As shown in FIG. 1, a rectangular magazine insertion inlet 3a through which a magazine 5 is inserted onto a predetermined mounting portion provided inside a housing 2 is provided in a front panel 3 of the housing 2. The magazine insertion inlet 3a is elongated in the rightward and leftward directions. In the drawing, the direction of an arrow X is left. An arrow Y directs the frontward direction and an arrow Z directs the upward direction. The magazine insertion inlet 3a is closed by a cover 6 owing to its swingable movement in the direction shown by an arrow F, the cover 6 being swingably attached on the front panel 3. Operation buttons 7, 8, and 10 for operating the multi-disk player 1 and an indicator 11 are provided on the front panel 3. The operation buttons 7, 8, and 10, and the indicator 11 are arranged collectively at the left side of the front panel 3 so that a car driver can operate them easily.

As shown in the views (a) through (f) of FIG. 2, the magazine 5 is a generally flat rectangular prism and provided with a pair of rectangular plate-like disk carrying units 13 equivalent in shape with each other and stacked one on the other, and a pair of top an bottom 14 and 15 each equivalent in outer dimensions with each the disk carrying units 13. The two disk carrying units 13, the top plate 14, and the bottom plate 15 are connected with each other by means of a plurality of studs 16a and screws 16b to be screwed respectively into female screw portions formed respectively in the tops ends of the studs 16a. The bottom plate 15 is substantially the same in shape as the disk carrying unit 13 except the lower surface portion thereof. The disk carrying units 13 and the bottom plate 15 respectively carry disks 17 so as to be able to displace each disk along a main surface of the disk. Accordingly, three disks 17 can be accommodated in the magazine 5. In the state where the magazine 5 has been mounted in the predetermined mounting portion inside the housing 2, the direction of arrangement of the respective disks 17 agrees with the upward and downward directions (the direction of the arrow Z and that opposite thereto).

As shown in FIGS. 1 and 2(b), a label 20 on which titles of musics recorded in the disks 17 accommodated in the magazine 5, and so on, have been printed is stuck on the front surface of the magazine 5.

As shown in FIG. 3, a plate-like projecting arm 21 made of a steel plate is provided in the vicinity of the deepest portion inside the respective disk carrying unit 13 and swingably attached on the disk carrying unit 13 by means of a pin 21a. The projecting arm 21 engages the outside periphery of the disk 17 at a swingable one end portion of the projecting arm 21, in this case, at the front end portion of the projecting arm 21, to thereby act as a projecting mechanism for making the disk 17 project out of the disk carrying unit 13, that is, out of the magazine 5, along the main surface of the disk 17. The projecting arm 21 has an arcuate portion 21b extending along the outer periphery of the disk 17, and a linear portion 21c continued to the arcuate portion 21b.

A disk engaging member 22 made of resin separately from a body of the projecting arm 21 is attached to a free end portion of the linear portion 21c, and as particularly apparent from FIG. 4, a groove 22a which can sandwich the main surfaces of the disk 17 is formed at a free end portion of the disk engaging member 22.

As shown in FIGS. 3 and 5, at the left end portion of the disk carrying unit 13, that is, at the end portion in the direction along which disk 17 is projected from the disk carrying unit, a taper portion 13a is formed to make it possible to accommodate the disk 17 into the magazine 5 smoothly.

A holding arm 24 is provided so as to rotate about the stud 16a placed in the vicinity of the pin 21a which is a pivotal axis of the projecting arm 21. The holding arm 24 engages the outer periphery of the disk 17 at the rotary one end portion, that is, at the left end portion in this case, of the holding arm 24 to urge the disk 17 to the disk accommodating position inside the disk carrying unit 13. A roller 24a is attached on a portion of the holding arm 24 engaging the outer peripheral portion of the disk 17. A coil spring 25 acting as urging force application means for applying urging force to the disk 17 is connected with the holding arm 24 at the other rotary end portion, that is, at the right end portion therof. One end portion of the coil spring 25 is connected to the stud 16a. A holding mechanism for holding the disk 17 at the disk accommodating position inside the disk carrying unit 13 is constituted by the holding arm 24 and the coil spring 25.

A trigger lever 26 extending in the left and rightward directions (the direction of arrow X and that opposite thereto) is arranged at the rear end portion of the disk carrying unit 13 so as to be capable of reciprocating in the leftward and rightward directions. The trigger lever 26 acts to actuate the above-mentioned holding mechanism (the holding arm 24 and so on) and the projecting arm 21 from the outside of the magazine 5, a left end portion 26a of the trigger lever 26 being exposed to the outside of the disk carrying unit 13. The trigger lever 26 is connected with the the other swing end portion, that is, the rear end portion, of the projecting arm 21, through an intermediate lever 27a, and pins 27b and 27c, so that the projecting arm 21 swings in response to the reciprocation of the trigger lever 26. The holding arm 24 is rotated counterclockwise in FIG. 3 in response to the engagement of the intermediate lever 27a with a portion 24b of the other rotary end portion of the holding arm when the holding arm 24 moves in the frontward direction (the direction opposite to the arrow X) together with the trigger lever 26, thereby releasing the urged state of the disk 17 by the holding arm 24. Further, as apparent from the FIG. 3, the trigger lever 26 is provided to be biased to one side portion, that is, to the rear side portion in this case, with respect to the direction for projecting/accommodating the disk 17 out of/into the disk carrying unit 13, that is, out of/into the magazine 5 (see FIG. 1). A coil spring 29 for applying bias force to the trigger lever 2 and the projecting arm 21 is connected to the trigger lever 26.

The disk carring unit 13 carrying the main surfaces of the disk 17 is projectingly provided with disk carrying protrusions 13c, 13d and 13e extending in the leftward and rightward directions (the direction of the arrow X and the opposite thereto), at the front and rear side portions of the disk carrying unit 13 as shown in FIGS. 3 and 6 so that the disk 17 is carried at its outer peripheral portion by the disk carrying protrusions 13c, 13d, and 13e.

Further, similarly to each of the side carrying units 13, such members as the projecting arms 21, the holding arm 24, the coil spring 25, the coil spring 29, the trigger lever 26 are provided also in the bottom plate 15 for carrying the lowest disk 17.

As shown in FIG. 1, substantially rectangular plate-like chassis 32 and 33 are provided side by side in the leftward and rightward directions (the direction of the arrow X and that opposite thereto) at a lower portion inside the housing 2.

As shown in FIGS. 7 through 9, a pair of guide shafts 34 and 35 extending in the frontward and rearward direction (direction of the arrow Y and that opposite thereto) are provided respectively at the left and right side portions of the chassis 33 arranged at the right portion in FIG. 9 inside the housing 2. A substantially rectangular carrying plate 37 directly carrying the magazine 5 inserted through the magazine insertion inlet 3a (shown in FIG. 1) is arranged between the guide shafts 34 and 35. The right end portion of the carrying plate 37 is slidably mounted on the right guide shaft 35 through a slider 38 made of resin. The slider 38 is smoothly fitted with the guide shaft 35 through U-shaped grooves 38a formed respectively at the front and rear end portions of the slider 38. The left end portion of the carrying plate 37 is slidably attached to the left guide shaft 34 through a pair of front and rear boss members 39. A magazine carrying portion is constituted by the carrying plate 37, the slider 38, and the boss members 39. A resin made movable member 41 is slidably mounted at its front and rear end portions onto the guide shaft 34 which supports the left end portion of the carrying plate 37. As particularly apparent from FIG. 9, a protrusion 41a projection upward is formed at the center portion of the movable member 41, and a slit 41b is formed in the protrusion 41a to extend in the leftward and rightward directions (the direction of the arrow X and that opposite thereto). A plate spring 42 attached on thet bottom surface of the carrying plate 37 is fittingly inserted in the slit 41b. That is, the carrying plate 37 is elastically coupled with the movable member 41. As shown in FIG. 7, a rack portion 41d is formed on the movable member 41 on the right side surface thereof substantially over the entire length of the same. A gear 44 provided on the carrying plate 37 is geared with the rack portion 41d. The gear 44 is coupled with an output shaft of an electric motor 50 through a double gear 45 in which a pinion portion gearing with the gear 44 and a warm wheel are integrally formed, a warm 46 gearing with the worm wheel, a large pulley 47 integrally formed with the worm 46, a belt 48, and a small pulley 49. Drive means for driving the movable member 41 is constituted by the gear 44, the double gear 45, the worm 46, the large pulley 47, the belt 48, the small pulley 49, and the motor 50. A magazine mounting/demounting mechanism for performing the mounting and the ejection of the magazine 5 (see FIG. 1) onto and from the predetermined mounting portion inside the housing 2, is constituted by the above mentioned drive means, the movable member 41, the magazine carrying portion constituted by the carrying plate 37, etc., and the peripheral small members concerned with them.

As shown in FIG. 7, for example, four disk-like magazine guide members 53 are attached on the magazine carrying surface of the carrying plate 37 for directly carrying the magazine 5 inserted from the magazine insertion inlet 3a (see FIG. 1). As shown in FIG. 2(f), on the other hand, two grooves 15a smoothly engageable with the magazine guide members 53 respectively are formed in the lower surface of the bottom plate 15 of the magazine 5. THe magazine 5 inserted from the magazine insertion inlet 3a is correctly guided onto the carrying plate 37 in position by the action of the magazine guide members 53 and the guide grooves 15a. If the magazine 5 is to be inserted upside down through the magazine insertion inlet 3a, the rear edge portion of the top plate 14 of the magazine 5 abuts against the magazine guide members 53 to thereby make it impossible to insert the magazine 5. That is, the reverse insertion of the magazine 5 is prevented.

As shown in FIGS. 7 and 8, a horizontal roller 55 is provided at the left front end portion of the carrying plate 37 so as to abut onto the lower surface of the magazine 5 to thereby guide the magazine 5 smoothly onto the carrying plate 37. A pair of vertical rollers 45 for guiding the magazine 5 onto the carrying plate 37 is provided at the right end portion of the carrying plate 37 separately from each other in the front and rearward directions. A guide plate 57 for guiding the magazine 5 and for preventing the carrying plate 37 of the magazine 5 from coming off upward is disposed at a portion sandwiched between the two vertical rollers 56.

As shown in FIGS. 7 and 8, a slide plate 58 is attached at the lower surface of the right side portion of the carrying plate 37 so as to be slidable within a predetermined range in the moving direction of the carrying plate 37, that is, in the frontward and rearward directions (the direction of the arrow Y and that opposite thereto). More sepcifically, three elongated holes 58a extending in the frontward and rearward directions is formed in the slide plate 58 and three pins 37a projectingly provided on the lower surface of the carrying plate 37 are slidably fitted into the elongated holes 58a respectively. A coil spring 59 is connected to the slide plate 58 to urge the latter frontward. A plate spring 60 having an end portion bent in the shape of "<" is provided at the rear end portion of the slide plate 58, and as shown in FIG. 3 the plate spring 60 is engageable with a notch portion 3g formed at the right rear end portion of each of the disk carrying units 13 constituting the magazine 5. In this manner, the engagement of the plate spring 60 with the notch portion 13g prevents the carrying plate 37 of the magazine 5 from coming off in the frontward directions (the direction of the arrow Y).

As shown in FIGS. 7 and 8, a rectangular resin made plate 62 is attached at the lower surface of the right end portion of the slide plate 58, and two detection switches 63 and 64 are disposed so that the plate 62 is engageable with its actuator. The detection switches 63 and 64 are attached onto the chassis 33. As shown in FIG. 7, a detection switch 65 is fixedly provided at the upper surface of the left rear end portion of the chassis 33, so that the rear end portion of the movable member 41 is engageable with an actuator of the detection switch 65.

As shown in FIGS. 7 and 8, three photo-sensors 67, 68, and 69 are provided at the upper surface of the right end portion of the carrying plate 37 side by side in the upward and downward directions (the direction of the arrow Z and that opposite thereto). The photo-sensors 67, 68 and 69 detect the movement of the right end surface 24d of the holding arm 24 shown in FIG. 3, as shown exposed outside the respective disk carrying unit 13 and the bottom plate 15 through the openings 13i and 15c respectively formed in the disk carrying unit 13 and the bottom plate 15 (see FIG. 2(c)). The photo-sensors 67 through 69 detect the movement of the right end surface 24d of the holding arm 24 by using the right end surface 24d as a reflecting plate. A disk existence detecting means for detecting the existence of each of the disks. 17 inside the magazine 5 is constituted by the photo-sensors 67, 68 and 69, and the holding arm 24 as an object to be detected.

Figure 10:
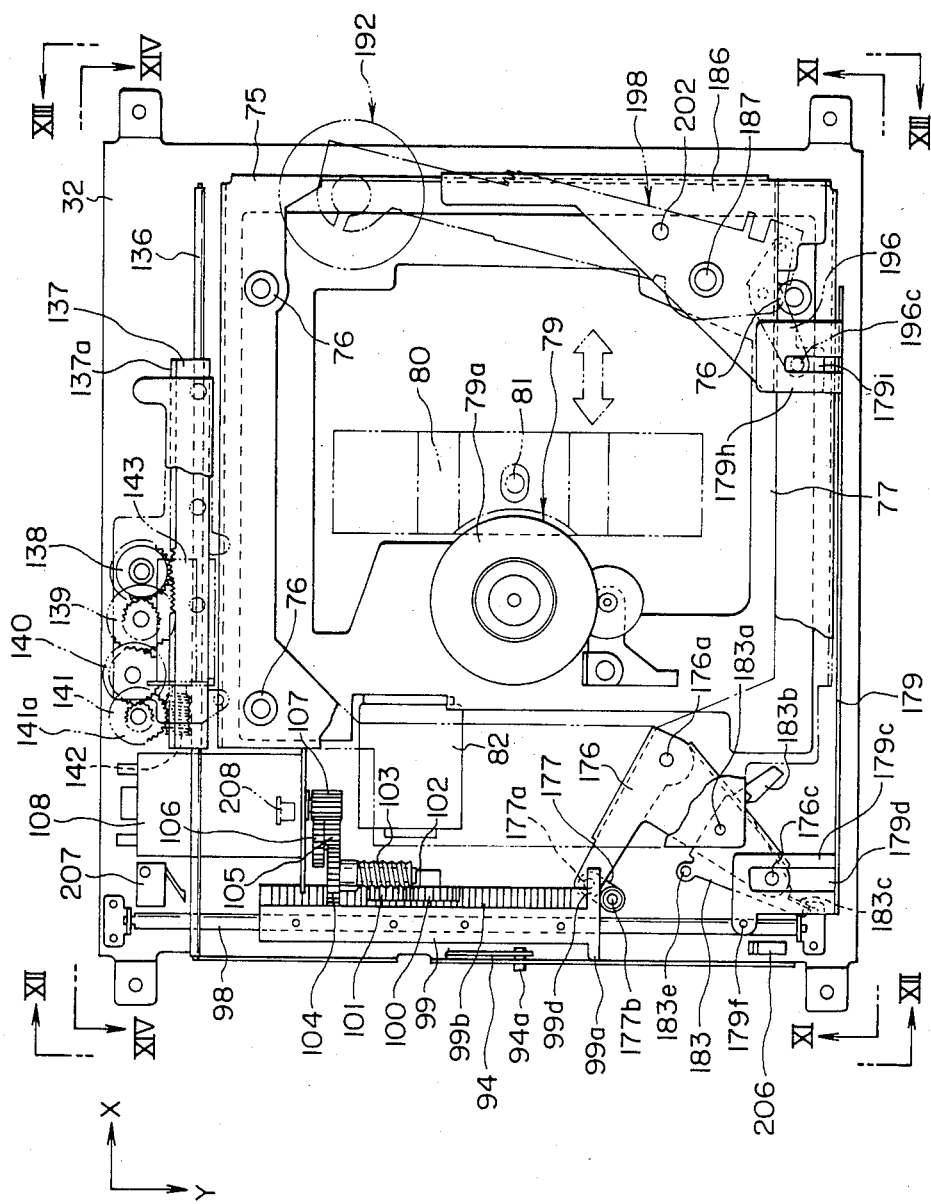
FIG. 10 is a plan of the disk conveying mechanism and the play-back means.
Figure 11:
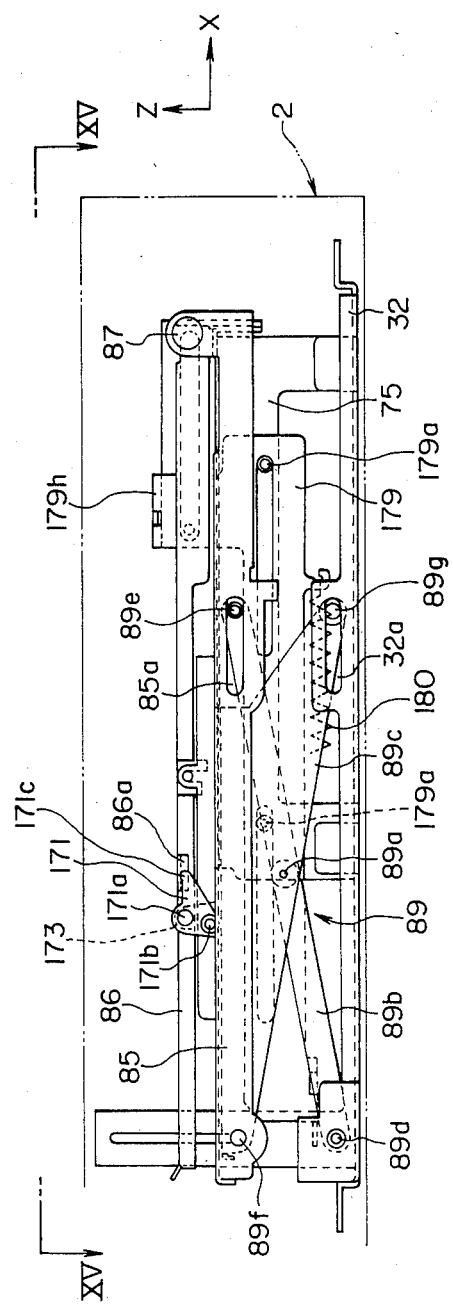
FIGS. 11 through 14 are diagrams viewed in the direction of the arrows XI—XI, XII—XII, XIII—XIII, and XIV—XIV, respectively, in FIG. 10.
Figure 12:
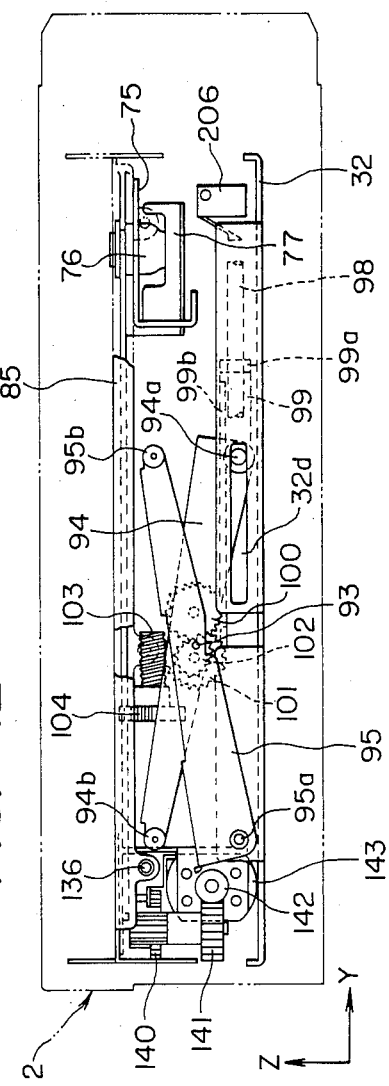
Figure 13:
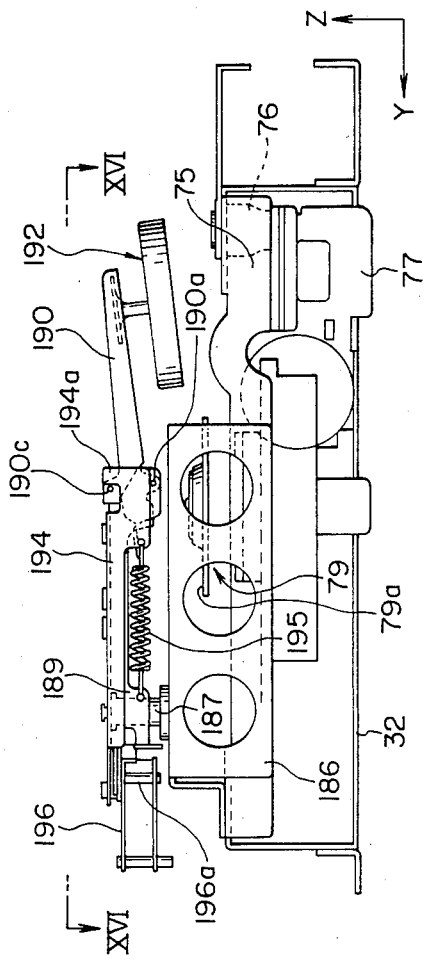

As shown in FIGS. 10, 11, and 13, a rectangular plate-like subchassis 75 a little smaller than the chassis 32 is fixed on the chassis 32 disposed at the left portion inside the housing 2. As shown partly in FIG. 12, a rectangular frame-like supporting member 77 is attached on the lower surface of the subchassis 75 through a plurality of vibration-proof members 76 made of rubber or the like. A turntable 79 and a carriage 80 are mounted on the supporting member 77. The carriage 80 incorporates optical pickup means including an objective lens 81, etc., and is arranged to be movable along a plane parallel to a disk carrying surface 79a of the turntable 79. Carriage driving means constituted by an electric motor 82 and so on for driving the carriage 80 is provided on the supporting member 77.

Play-back means for reproducing a disk is constituted by the carriage driving means, the turntable 79, the carriage comprising the optical pickup means, and peripheral members in connection with them.

Figure 14:
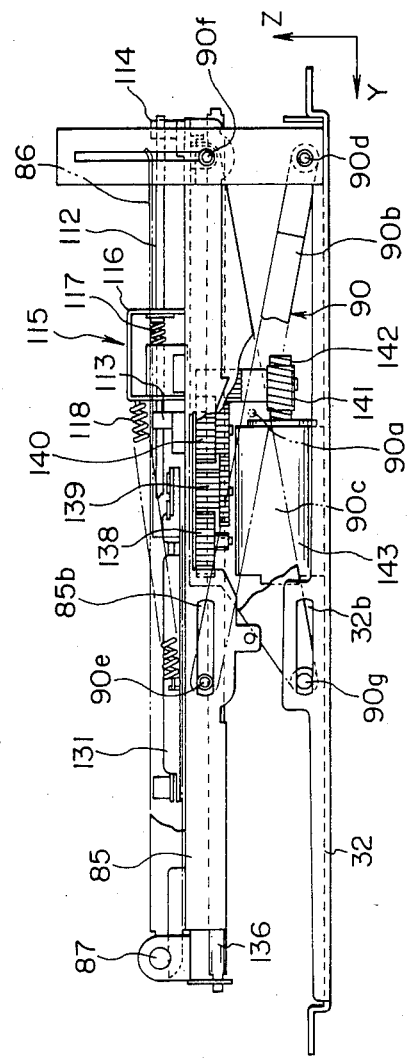
Figure 15:
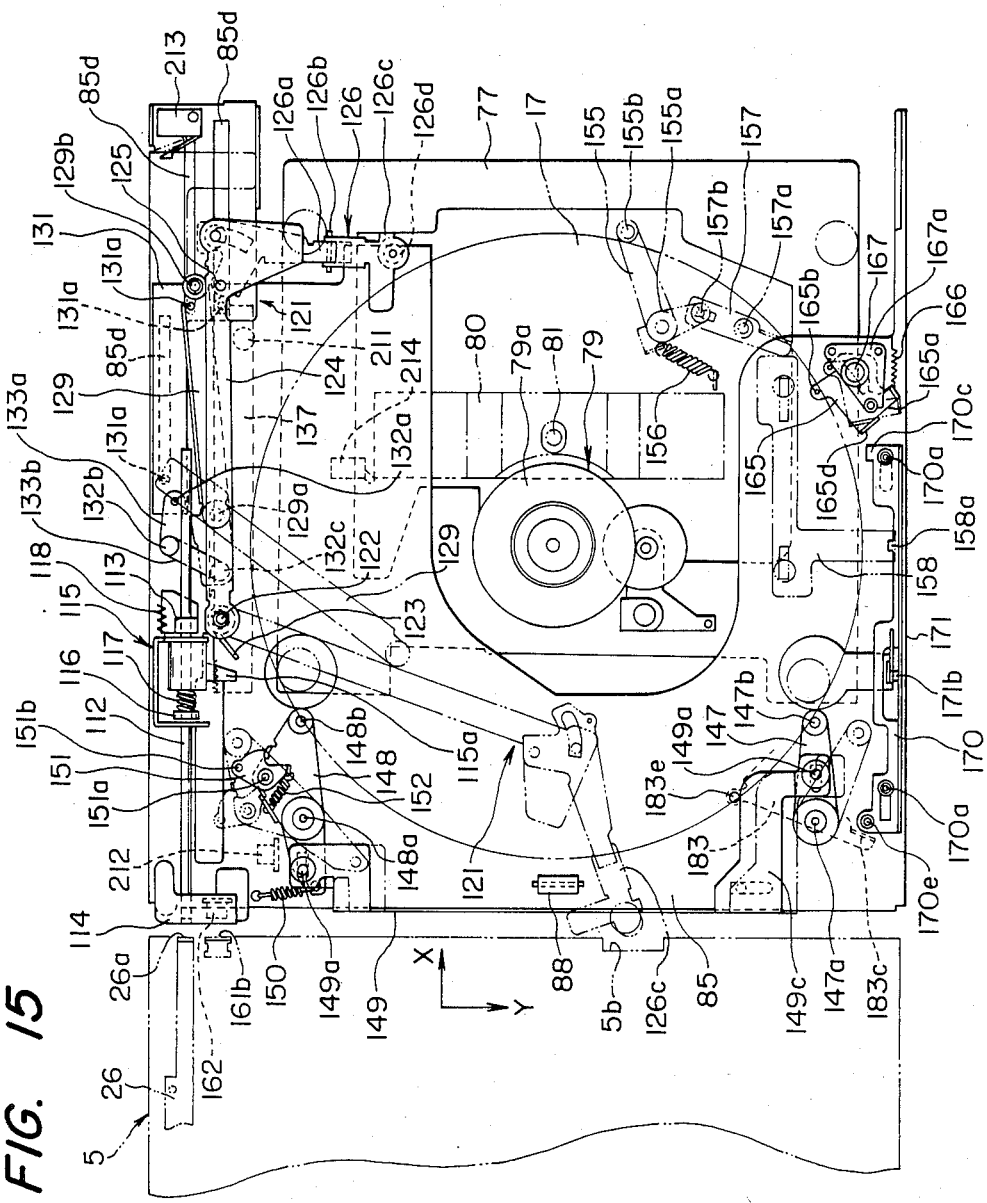
FIG. 15 is a diagram viewed in the direction of arrow XV—XV in FIG. 11.

As shown in FIGS. 11, 12, 14, and 15, a rectangular plate-like disk carrying portion 85 made of a steel plate is disposed at a position where the disk carrying portion 85 cooperates with the chassis 32 to sandwich the subchassis 75 therebetween, while the chassis 32 is not shown in FIG. 13. The disk carrying portion 85 is arranged to carry the disk 17 projected from the magazine 5 (see FIG. 1, etc.) and is movable in the direction of arrangement of the respective disk in the magazine, that is, in the upward and downward directions (the direction of the arrow Z and the direction opposite thereto). As shown in FIGS. 11 and 14, a rectangular plate-like disk guide member 86 is swingably attached at its left end portion onto the disk carrying portion 85 through a pin 87 and arranged to come into slidable contact with the lower surface of the disk 17 projected from the magazine 5 to thereby guide the disk 17 onto the disk carrying portion 85. As shown in FIG. 15, a roller 88 is provided at a right end portion of the disk carrying portion 85 such that the roller 88 comes into contact with the lower surace of the disk 17 to thereby guide the disk 17. The disk guide member 86 swings within a plane including the upward and downward directions (the direction of the arrow Z and that opposite thereto). In FIG. 17, the disk guide member 86 is shown in detail.

As shown in FIGS. 11 and 14, the disk carrying portion 85 is supported by a pair of supporting mechanisms 89 and 90 at the front and rear side portions of the disk carrying portion 85. The pair of the supporting mechanisms 89 and 90 support the disk carrying portion 85 so as to make the latter movable in the direction perpendicular to the disk carrying surface 79a (see FIG. 13 etc.) of the turntable 79, that is in the upward and downward directions (the direction of the arrow Z and that opposite thereto) and further so as to make the disk carrying surface of the disk carrying portion be always parallel with the disk carrying surface 79a of the turntable 79. As shown in FIG. 11, the supporting mechanism 89 for supporting the front side portion of the disk carrying 85 is constituted by a pair of supporting levers 89b and 89c which cross each other and are pivotally connected to each other with a pin 89a at the crossing portion.

The one supporting lever 89b is pivotally attached at its one end to the chassis 32 through a pin 89d at one end portion of the supporting lever 89b. A pin 89e is projectingly provided on the supporting lever 89b at the other end portion thereof and the pin 89e is slidably fitted in an elongated hole 85a formed in the disk carrying portion 85 so as to extend in the leftward and right directions (the direction of the arrow X and that opposite thereto). The other supporting lever 89c is pivotally attached at its one end to the disk carrying portion 85 through a pin 89f. A pin 89g is projectingly provided on the supporting lever 89c at the other end portion thereof and the pin 89g is slidably fitted in an elongated hole 32a formed in the chassis 32 so as to extend in the leftward and rightward directions.

As shown in FIG. 14, the supporting mechanism 90 for supporting the disk carrying portion 85 at the rear side portion thereof is constituted by two supporting levers 90b and 90c which cross each other and which are pivotally attached to each other with a pin 90a at the crossing portion. The supporting lever 90b is pivotally attached at its one end to the chassis 32 through a pin 90d and a pin 90e projectingly provided on the supporting lever 90b at the other end portion thereof is slidably fitted in an elongated hole 85b formed in the disk carrying portion 85 so as to extend in the leftward and rightward directions. The other supporting lever 90c is pivotally attached at its one end to the disk carrying portion 85 through a pin 90f. A pin 90g is projectingly provided on the supporting lever 90c at the other end portion thereof and the pin 90g is slidably fitted in an elongated hole 32b formed in the chassis 32 so as to extend in the leftward and rightward directions (the direction of the arrow X and that opposite thereto).

The supporting levers 89c and the 90c, which are the constituent members of the two upporting mechanisms 89 and 90 respectively, are connected with each other through an intermediate member (not shown) and both the supporting mechanisms are made to move in synchronism with each other. The intermediate member is provided between the respective right end portions of the supporting levers 89c and the 90c, that is, in the vicinity of the pins 89f and 90f respectively.

As shown in FIG. 12, a pair of driving levers 94 and 95 are provided on the chassis 32 at the right end portion of the latter such that they cross each other and are connected with each other through a pin 93 at the crossing portion so as to be rotatable relative to each other. A pin 94a is projectingly provided on the driving lever 94 at an end portion of the latter, that is at a lower end portion of the latter in this case, and the pin 94a is slidably fitted in an elongated hole 32d formed in the chassis 32 extending in the frontward and rearward directions (the direction of the arrow Y and that opposite thereto). A roller 94b made of resin is attached to the driving lever 94 at the other end of the latter and the roller 94b is arranged to come into contact with the lower surface of the above-mentioned intermediate member (provided to make the supporting mechanisms 89 and 90 connect with each other: not-shown). The other driving lever 95 is pivotally attached at one end portion thereof (the lower end portion) to the chassis 32 through a pin 95a. A roller 95b is provided on the driving lever 95 at the other end portion of the latter and the roller 95b is arranged to come in contact with the intermediate member. That is, if the pin 94a projectingly provided on the one driving lever 94 is moved rearward (in the direction opposite to the arrow Y) along the elongated hole 32d, both the driving levers 94 and 95 are made to rise upward, so that the above-mentioned intermediate member (not shown), and hence the disk carrying portion 85 is made to move upward.

As shown in FIGS. 10 and 12, a guide shaft 98 is provided on the chassis 32 at the right end portion of the latter to extend in the frontward and rearward directions, and a movable body 99 is slidably attached to the guide shaft 98. A protrusion 99a engageable with the front edge of the pin 94a projectingly provided on the driving lever 94 is formed on the movable body 99 at the front end portion of the latter. A rack portion 99b is formed on the movable body 99 at the upper surface of the latter substantially over the entire length of the same, and a gear 100 gears with the rack portion 99b. The gear 100 is connected with an output shaft of an electric motor 108 through the gear 101, a warm wheel 102 integrally formed with the gear 101, a worm 103 geared with the worm wheel 102, a gear 104 integrally formed with the worm 103, a gear 105 geared with the gear 104, a gear 106 integrally formed with the gear 105, and a gear 107 geared with the gear 106.

Driving force application means for applying the driving force to the above-mentioned intermediate member (provided for connecting the two supporting mechanisms 89 and 90 for supporting the disk carrying portion 85 at the front and rear side portions thereof respectively: not shown) to drive the disk carrying portion 85, is constituted by the driving lever 94 and 95, the pin 93, the guide shaft 98, the movable body 99, the gears 100, 101, 104, 105, 106, and 107, the worm wheel 102, the worm 103, the motor 108, and the peripheral small members in connection with them. Further, disk displacing means for moving the disk 17 projected from the magazine 5 (see FIG. 1, etc.) in the direction perpendicular to the disk carrying surface 79a of the turntable 79 (see FIGS. 10 and 14), that is, in the upward and downward directions (the direction of the arrow Z and the opposite thereto) is constituted by the driving force application means, the intermediate member (not shown), the supporting mechanisms 89 and 90, and the disk carrying portion 85.

Next, description will be made as to disk projecting-/accommodating means which causes the disk 17 to project toward the magazine 5 so as to be accommodated in the magazine 5.

As shown in FIGS. 14 and 15, an actuating rod 112 made of round steel is arranged to extend in the leftward and rightward directions (the direction of the arrow X and that opposite thereto) on the disk carrying portion 85 at the rear end upper surface of the latter and attached to the disk carrying portion 85 so as to be able to reciprocate in the extending direction through bearing members 113 and 114. The actuating rod 112 is a member for pushing the left end portion 26a of the trigger lever 26 in the magazine 5 by the front ward movement (movement rightward, that is, the direction opposite to the arrow X) of the rod 112 to actuate the trigger lever 26 to operate. A movable piece 115 is attached to the actuating rod 112 at the substantially central portion of the latter so as to be movable within a predetermined range (about 3 mm) along the actuating rod 112. A stopper 116 is fixed at the central portion of the actuating rod 112 and in the vicinity of the movable piece 115, and a coil spring 117 is compressedly provided between the stopper 116 and the movable piece 115. A coil spring 118 for urging the actuating rod 112 together with the movable piece 115 in the rearward moving direction to cause the actuating rod 112 to return (leftward, that is, in the direction of the arrow X) is connected with the movable piece 115 at the left end portion of the latter.

A push-out arm 121 is attached on the disk carrying portion 85 in the vicinity of the actuating rod 112 so as to be swingable about a pin 122 and along the disk holding surface of the disk carrying portion 85, so that the push-out arm 121 presses a peripheral portion of the disk 17 by a free end portion of the arm 121 so as to push the disk 17 out of the disk carrying portion 85 to make the disk 17 be accommodated into the magazine (see FIG. 1, etc.). In FIG. 15, a position of the push-out arm 121 shown by a two-dotted chain line is referred to as a pushing-out position (pushing out the disk 17) and a position of the push-out arm 121 shown by a solid line is referred to as a non-pushing-out position. The push-out arm 121 urged toward the non-pushing-out position by a spring member 123 inserted onto the pin 122 which acts as a pivotal axis of the push-out arm 121.

The push-out arm 121 is provided with an arm body 124 swingable about the pin 122, and a subarm 126 attached to the arm body 124 at a free end portion of the latter through a pin 125 so as to be rotatable within a predetermined range. The pin 125 extends in parallel with the pin 122 which is the pivotal axis of the arm body 124, so that the swinging of the arm body 124 and the rotation of the subarm 126 are performed substantially in the same plane. That is, the push-out arm 121 is able to be bent as a whole and a connecting portion between the arm body 124 and the subarm 126 is the bent portion. As shown in FIG. 15, the push-out arm 121 is bent at an angle of about 90 degrees when the push-out arm 121 is at the above-mentioned non-pushing-out position.

The subarm 126 is constituted by an arm A 126a rotatable about the pin 125, and an arm B 126c swingably attached to the arm A 126a at a free end portion of the latter through a pin 126b and arranged to engage at its free end portion with the periphery of the disk 17. The pin 126b extends perpendicularly to the pin 125, so that the arm B 126c swings in a plane perpendicular to the disk holding surface of the disk carrying portion 85. A roller 126d is provided at an engagement portion between the arm B 126c and the outer peripheral portion of the disk, so that arm B 126c and the outer peripheral portion of the disk can smoothly engage with each other. The arm body 124 is shown in detail in the views (a) and (b) of FIG. 18, and the arm A 126a, the arm B 126c, and so on are shown in detail in the views (a) through (c) of FIG. 19 and the views (a) through (c) of FIGS. 20.

As shown in FIG. 15, a driving arm 129 is arranged under the push-out arm 121 and rotatably attached to the disk carrying portion 85 through a pin 129a. The driving arm 129 is shown in detail in the views (a) and (b) of FIG. 21. The driving arm 129 is a member which engages at its one end with the free end portion of the push-out arm 121 so as to swing to move the pushout arm 121 into the pushing-out position. A roller 129b is provided at an engagement portion between the driving arm 129 and the push-out arm 121 so that the driving arm 129 and the push-out arm 121 engage smoothly with each other.

An L-shaped slide plate 131 is provided at the rear side of the push-out arm 121 and the driving arm 129 so as to be movable in the leftward and rightward directions (the direction of the arrow X and that opposite thereto). Specifically, three pins 121a are projectingly provided on the lwoer surface of the slide plate 131 and the pins 131a are respectively slidably fitted in three elongated holes 85d formed in the disk carrying portion 85 so as to extend in the leftward and rightward directions. A right end portion of the slide plate 131 is connected with the driving arm 129 at the other rotary end portion of the latter through three pins 132a, 132b, and 132c, and two relay levers 133a and 133b. That is, the the displacement of the slide plate 132 causes the driving arm 129 to rotate so that the push-out arm 121 is caused to swing. The coil spring 118 for urging the actuating rod 112 leftward is connected at the other end portion thereof with the slide plate 131, and the slide plate 131 is supplied with bias force by the coil spring 118.

A guide shaft 136 shown in FIGS. 10, 12, and 14 is provided on the disk carrying portion 85 under the actuating rod 112 and the slide plate 131 so as to extend in the leftward and rightward directions (the direction of the arrow X and that opposite thereto), and a movable body 137 shown also in FIG. 15 is slidably attached to the guide shaft 136. The movable body 137 engages at its right end portion with the lower surface of the movable piece 115 to thereby cause the actuating rod 112 to move frontward (rightward, that is, in the direction opposite to the arrow X). Further, the movable body 137 engages at its left end portion with the slide plate 131 so as to cause the push-out arm 121 to swing to the pushing-out position (where the disk 17 is pushed out of the disk carrying portion 85).

A rack portion 137a as is formed on the rear surface of the movable body 137 over the entire length of the latter and a gear 138 gears with the rack portion 137a. The gear 138 is connected with an output shaft of an electric motor 143 through three double gears 138, 140, and 141n, and a worm 142 gears with a gear portion 141a of the double gear 141, each of the double gears being constituted by two, large and small, gears integrally.

Moving force application means for applying moving force to the movable body 137 is constituted by the gear 138, the double gears 139, 140, and 141, the worm 142, and the motor 143. Further, a driving source for driving the actuating rod 112 and the push-out arm 121 is constituted by the moving force application means, the movable body 137, and the coil spring 118 and the spring member 123 which are urging means. Disk projecting-/accommodating means for projecting the disk 17 toward the magazine 5 and for causing the magazine to accommodate the projected disk 17 thereinto, is constituted by the driving source, the actuating rod 112, and the push-out arm 121.

Next, description will be made as to means for positioning the disk 17 projected from the magazine 5 in a predetermined position on the disk carrying portion 85.

Figure 22:
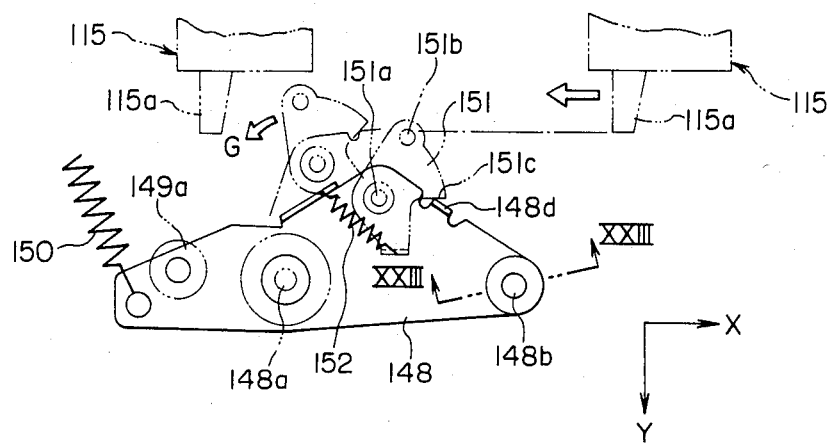
Figure 23:
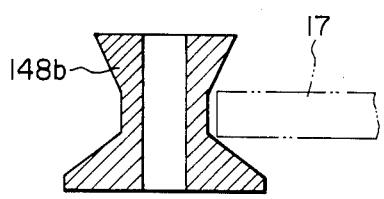
Figure 24:
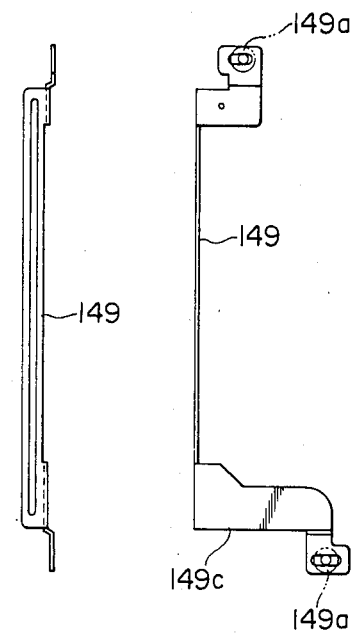

As shown in FIG. 15, two swing levers 147 and 148 are arranged at the front and rear end portions of the disk carrying portion 85 and in the vicinity of the magazine 5 and swingably attached to the disk carrying portion 85 through pins 147a and 148a. In FIG. 22, the swing lever 148 is shown in detail. Pins 147b and 148b engaged with the disk 17 at the outer peripheral portion of the latter are projectingly provided at the respective free end portions of the swing levers 147 and 148. FIG. 23 shows a cross-section of the pin 148b. The pins 147b and 148b are entirely equivalent in shape to each other. The swing levers 147 and 148 are connected with each other by a link lever 149 for interlinking the swing levers 147 and 148 through a pin 149a. FIG. 24 shows the link lever 149 in detail. As shown also in FIG. 22, the swing lever 148 is connected with a coil spring 150 acting as engaging force application means for applying engaging force with the outer peripheral portion of the disk to the swing levers 147 and 148.

As shown in FIGS. 15 and 22, an intermediate plate 151 is rotatably attached to the swing lever 148 at a free end portion of the latter through an intermediate plate 151a. In the views (a) and (b) of FIG. 25, the intermediate plate 151 is shown in detail. A pin 151b extending upward (the direction of the arrow Z) is projectingly provided on the intermediate plate 151 at a free end portion of the latter, so that an expanded portion 115a projectingly provided on the movable piece 115 moving together with the actuating rod 112 is engageable with the pin 151b. A pawl portion 151c is formed on the intermediate plate 151, so that the pawl portion 151c engages with the protrusion 148d provided on the swing plate 148 so as to prevent the intermediate plate 151 from rotating clockwise (for example, in FIG. 22) about the pin 151a. Counterclockwise rotation of the intermediate plate 151, on the contrary, is permitted in a predetermined range. A coil spring 152 is connected with the intermediate plate 151 so as to urge the intermediate plate 151 clockwise.

As shown in FIG. 15, another L-shaped swing lever 155 is arranged in the vicinity of the left end portion of the disk carrying portion 85. The swing lever 155 is swingably attached to the disk guide member 86 (see FIG. 17, etc.) through a pin 155a. A pin 155b engaged with the outer peripheral portion of the disk 17 is projectingly provided on the swing lever 155 at a free end portion of the latter. The swing lever 155 is connected with a coil spring 156 acting as engaging force application means for supplying the swing lever 155 with engaging force with the outer peripheral portion of the disk 17.

A rotary lever 157 rotatable about a pin 157a is arranged in the vicinity of the swing lever 155, and a rotary end portion of the rotary lever 157 is pivotally attached to the swing lever 155 at a free end portion of the latter through a pin 157b. An L-shaped slide plate 158 which can reciprocate in the leftward and rightward directions (the direction of the arrow X and that opposite thereto) is arranged in the right side of the rotary lever 157 and a left end portion of the slide plate 158 engages the rotary lever 157 at the other rotary end portion of the latter. That is, if the slide plate 158 moves leftward (in the direction of the arrow X), the pin 155b of the swing lever 155 is caused to come off from the outer peripheral portion of the disk.

The positioning means for positioning the disk 17 projected from the magazine 5 into a predetermined position on the disk carrying portion 85, that is, into the position just above the turntable 79 is constituted by the swing levers 147, 148, and 155, the link lever 149, the coil springs 150 and 156, and the peripheral small members such as the pins and the like in connection with them.

The disk 17 projected from the magazine 5 is exactly positioned on the disk carrying portion 85 owing to the operations of the three swing levers 147, 148, and 155, and the coil springs 150 and 156. It is considered, however, there occurs a case where the disk 17 is caught by any member so that the disk 17 becomes impossible to be drawn into the predetermined position on the disk carrying portion 85 (just above the turntable 79) only by the urging force of the coil spring 150. Assume that such a fault occurs and the swing levers 147 and 148 are, for example, at the positions shown by the two-dotted chain lines in FIGS. 15 and 22. Then, as shown in FIG. 22, the movable piece 115 is moved rightward (in the direction opposite to the arrow X) together with the actuating rod 112, and the movable piece 115 is positioned in the righthand of the intermediate plate 151. Although the expanded portion 115a of the movable piece 115 comes into contact with the pin 151b of the intermediate plate 151 during the movement of the movable piece 115, the intermediate plate 151 is rotatable in the direction of an arrow G, so that the intermediate plate 151 is rotated counterclockwise about the pin 151a as the movable piece 115 moves rightward. If the intermediate plate 151 rotates counterclcokwise by a predetermined angle, the pin 151b comes off from the expanded portion 115a to thereby complete the displacement of the movable piece 115. Further, if the pin 115b comes off from the expanded portion 115a, the intermediate plate 151 is made to return clockwise at once by the urging force of the coil spring 152. Next, the movable piece 115 is moved leftward (in the direction of the arrow X) and the expanded portion 115a of the movable piece 115 comes into contact with the pin 151b of the intermediate plate 151. Because the intermediate plate 151 cannot rotate clockwise, as described above, the swing lever 148 swings clockwise (in FIG. 22) about the pin 148a together with the intermediate plate 151 due to the rightward movement of the movable piece 115. Further, the swing lever 147 connected with the other swing lever 148 to link with the latter through the link lever 149 is made to swing counterclockwise (in FIG. 15) about the pin 147a. Accordingly, the pins 147b and 148b attached to the respective free ends of the swing levers 147 and 148 press the outer peripheral portion of the disk 17, so that the disk 17 is forced to be positioned just above the turntable 79. That is, the swing levers 147 and 148 are caused to swing by the disk projecting means (above-mentioned) including the movable piece 115 so that the respective free end portions of the swing levers 147 and 148 press the outer periphery of the disk.

Next, description will be made hereunder as to the position detection means for detecting the arrival of the above-mentioned disk carrying portion 85 at the position where the disk carrying portion 85 can carry a desired disk 17 projected from the magazine 5 to thereby stop the disk carrying portion 85 thereat, and the detection means for detecting the fact that the disk 17 projected from the magazine 5 has been carried by the disk carrying portion 85 at the predetermined portion thereof (just above the turntable 79).

As shown in FIG. 2(d), and FIGS. 3 and 15, reflection plates 161a, 161b, and 161c acting as three marks are provided on the magazine 5 at the left side surface in the rear end portion of the latter, along the direction of arrangement of the three disks 17 accommodated in the magazine 5, that is, in the upward and downward directions (the direction of the arrow Z and that opposite thereto). Specifically, these three reflection plates 161a, 161b, and 161c are provided correspondingly respectively on the two disk carrying units 13 and on the bottom plate 15 constituting the body of the magazine 5. On the other hand, as shown in FIG. 15, a photo-sensor 162 for detecting each of the reflection plates 161a through 161c is provided on the disk carrying portion 85 at a right rear end portion of the latter. As apparent from FIG. 15, the photo-sensor 162 is disposed adjacently to the actuating rod 112. Further, the bearing member 114 for reciprocally movably supporting the actuating rod 112 is used also as an attaching member for attaching the photo-sensor 162 to the disk carrying portion 85. Accordingly, the number of parts is reduced and the cost can be reduced in comparison with the case where the attaching member for attaching the photo-sensor 162 to the disk carrying portion 85 is specially provided separately from the the bearing member 114. Further, the actuating rod 112 and the photo-sensor 162 are arranged to be supported by the bearing member 114 which is an integral single member, so that accuracy in relative positional dimension of the actuating rod 112 and the photo-sensor 162 is extremely improved.

The position detection means for detecting the arrival of the above-mentioned disk carrying portion 85 at the position where the disk carrying portion 85 can carry a desired disk 17 projected from the magazine 5 to thereby stop the disk carrying portion 85 thereat, is constituted by the reflection plates 161a, 161b, and 161c, and the photo-sensor 162.

As shown in FIG. 15, a swing plate 165 is swingably attached to the disk carrying portion 85 at the upper surface in left front end portion of the latter by a pin 165a. A pin 165b is projectingly provided at a free end of the swing plate 165, the pin 165b being engageable with an outer peripheral portion of the disk 17. A coil spring 166 is connected to the swing plate 165 to apply engagement force to cause the swing plate 154 to engage the disk 17. A photo-sensor 167 to be actuated by the swing plate 165 is disposed above the swing plate 165, and attached to the disk carrying portion 85 by a attaching member 167a. The detection means for detecting the fact that the disk 17 projected from the magazine 5 has been carried on the disk carrying portion 85 at the predetermined position (just above the turntable 79) and has been positioned, is constituted by the swing plates 165 and the photo-sensor 167.

As shown in FIG. 15, a movable plate 170 arranged at the righthand of the swing plate 165 to extend in the leftward and rightward directions (the direction of the arrow X and that opposite thereto), and attached to the disk carrying portion 85 through a pin 170a so as to be able to reciprocate in the leftward and rightward directions. When driving force is applied to the movable plate 170, the movable plate 170 is caused to reciprocate to thereby lift the disk guide member 86 upward through a left lever 171 shown in FIGS. 11 and 15 during play-back of the disk 17 so as to separate the disk guide member 86 from the disk guiding position by a predetermined distance (about 4 mm) relative to the foregoing play-back means including the turntable 79. As shown in FIG. 11, the substantially triangularly shaped lift lever 171 is rotatably attached, through a pin 171a, to a substantially triangularly shaped bracket 173 projectingly provided on the disk carrying portion 85. One rotary end portion of the lift lever 171 is pivotally attached on the foregoing movable plate 170 through a pin 171b, while the other rotary end portion of the lift lever 171 engages a lower surface of an expanded portion 86a (shown also in FIG. 17) formed on a front end portion of the disk guide member 86.

As apparent from FIG. 15, a left end portion 170c of the movable plate 170 for causing the disk guide member 85 to operate is engageable with a part 165d of the free end of the swing plate 165. Therefore, during playback of the disk 17, the swing plate 165 is caused to swing clockwise in FIG. 15 about the pin 165a by the movable plate 170 so as to cause the pin 165b of the swing plate 165 to separate from the outer peripheral portion of the disk 17.

Now, description will be made as to means for applying driving force to the foregoing movable plate 170.

As shown in FIG. 10, a lever member 176 in the shape of "<" is attached to a right front end portion of the chassis 32 rotatably about a pin 176a. The views (a) and (b) of FIG. 26 show this lever member 176 in detail. A small intermediate lever 177 is pivotally attached at its one end portion, through a pin 177a, on the lever member 176 at one rotary end portion of the latter, a pin 177b being projectingly provided on the other end portion of the intermediate lever 177. Further, as shown in FIG. 10, a protrusion 99d is formed on a front end portion of the movable body 99 driven by the motor 108, such that the protrusion 99d extends in the direction opposite to the protrusion 99a, leftward in this case (in the direction of the arrow X) so as to be engageable with the pin 177b provided on the intermediate lever 177.

As shown also in FIG. 11, a slide plate 179 extending in the leftward and rightward directions (the direction of the arrow X and that opposite thereto) is disposed in front of the subchassis 76 provided on the upper surface of the chassis 32, and is attached to the chassis 32 through a pin 179a so as to be able to reciprocate in the extending direction, that is, in the leftward and rightward directions. The views (a) and (b) of FIG. 27 show the slide plate 179 in detail. The slide plate 179 is urged rightward (in the direction opposite to the arrow X) by a coil spring 180. An expanded portion 179c extending rearward (in the direction opposite to the arrow Y) is formed on the slide plate 179 and to the right end portion of the latter, and an elongated hole 179d extending in the frontward and rearward directions is formed in the expanded portion 179c. A pin 176c is projectingly provided on the other rotary end portion of the lever member 176, and smoothly fitted in the elongated hole 179d formed in the slide plate 179. That is, the movable body 99 moves frontward (in the direction of the arrow Y) to thereby rotate the lever member 176 counterclockwise in FIG. 10 about the pin 176a so as to cause the slide plate 179 to move leftward (in the direction of the arrow X).

A lever member B 183 is disposed in the vicinity of the lever member 176, and rotatably attached at its substantially central portion to the subchassis 75 by pin 183a. The views (a) and (b) of FIG. 28 show the lever member B 183 in detail. One rotary end portion of the lever member B 183 is made to be a cam portion 183b which is engageable with a pin 179f projectingly provided on the expanded portion 179c of the slide plate 179. That is, the movement of the slide plate 179 leftward (in the direction of the arrow X) causes the lever member B 183 to move counterclockwise in FIG. 10 about the pin 183a.

An expanded portion 183c extending upward (in the direction of the arrow Z) is formed on the other rotary end portion of the lever member B 183, so as to be engageable with a pin 170e projectingly provided on the movable plate 170 at the right end portion of the latter as shown in FIG. 15. That is, driving force is applied to the movable plate 170 by the motor 108 for applying driving force to the movable body 99 (shown in FIG. 10), and so on, through the lever member 176, the slide plate 179, and the lever member B 183 in order.

As shown in FIGS. 10 and 15, and views (a) and (b) of FIG. 28, a pin 183e is projectingly provided on the lever member B 183 at a free end portion of the latter. As shown in FIG. 15, the pin 183e is arranged to be engageable with a rear edge portion of a protrusion 149c formed on a front end portion of the link lever 149 to project leftward (in the direction of the arrow X). That is, the lever member B 183 is rotated counterclockwise in FIG. 10 or FIG. 15 about the pin 183a as described above to thereby cause the link lever 149 to move frontward (in the direction of the arrow Y) so as to separate the two swing levers 147 and 148 from the outer peripheral portion of the disk 17.

Further, as shown in FIG. 15, the movable plate 170 is connected, in the vicinity of its left end, to the slide plate 158 by a pin 158a. Therefore, when the lever member B 183 is rotated counterclockwise as described above, the slide plate 158 is caused to move leftward (in the direction of the arrow X) together with the movable plate 170 so as to separate another swing lever 155 from the outer peripheral portion of the disk 17.

A disk conveying mechanism for selecting desired ones of the disks 17 accommodated in the magazine 5 one by one, for conveying the selected disks 17 one by one onto the disk carrying surface 79a of the turntable 79, and for sending back the disks 17 one by one into the magazine 5, is constituted by the disk projecting/accommodating means (constituted by the actuating rod 112, the push-out arm 121, and so on), the disk displacing means (constituted by the disk carrying portion 85, the supporting mechanisms 89 and 90, and so on), the positioning means including the swing levers 147 and 148, and so on, the position detection means including the photo-sensor 162 and so on, the disk guide member 86, the detection means constituted by the swing plate 165 and the photo-sensor 167, the movable plate 170, and peripheral members associated with the foregoing means.

Next, description will be made as to a clamping mechanism for clamping the disk 17 conveyed onto the turntable 79.

As shown in FIGS. 10 and 13, a bracket 186 is provided on a left front portion of the subchassis 75, and a rotary supporting shaft 187 extending in the upward and downward directions (the direction of the arrow Z and that opposite thereto) is attached on the bracket 186 at a substantially central portion of the latter. Although the foregoing disk projecting/accommodating means (constituted by the actuating rod 112, the push-out arm 121, and so on) is disposed in the vicinity of the deepest portion of the magazine mounting portion in the housing 2, the rotary supporting shaft 187 is disposed on side of the magazine insertion inlet 3a (see FIG. 1) which is an inlet of the magazine mounting portion.

Figure 16:
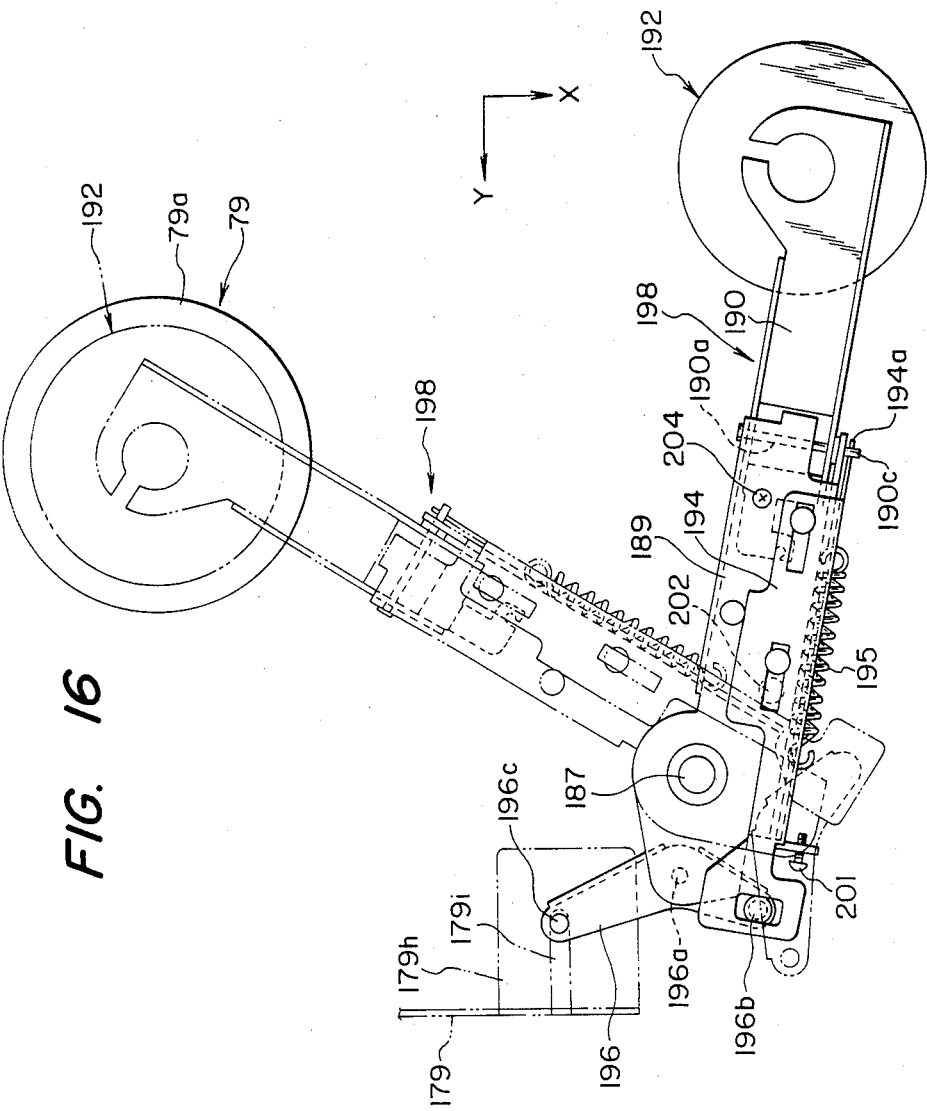
FIG. 16 is a diagram viewed in the direction of arrow XVI—XVI in FIG. 13.

As apparent particularly in FIG. 16, an elongated arm body 189 is rotatably attached to the rotary supporting shaft 187. The views (a) through (c) of FIG. 29 show the elongated arm body 189 in detail. The elongated arm body 189 rotates along a plane parallel to the disk carrying surface 79a of the turntable 79 (see FIG. 10) because the rotary supporting shaft 187 extends in the upward and downward directions (the direction of the arrow Z and that opposite thereto). A subarm 190 is provided on one rotary end portion of the elongated arm body 189 through a pin 190a so as to be swingable within a predetermined range. The views (a) through (c) of FIG. 30 show the subarm 180 in detail. The pin 190a extends in parallel to the disk carrying surface 79a of the turntable 79 so that the subarm 190 in a plane perpendicular to the disk carrying surface 79a. A disk-like pressing plate 192 is rotatably attached to a free end portion of the subarm 190 such that the pressing plate 192 comes in contact with the surface of the disk 17 to be play-back opposite to the turntable 79 so as to perform a disk clamping function in cooperation with the turntable 79. The subarm 190 swings between a first position where the pressing plate 192 performs the clamping operation and a second position where the clamping operation by the pressing plate 192 is released. The pressing plate 192 performs the clamping operation by magnetic force of a magnet provided in the pressing plate 192, and the turntable 79 is therefore made of a magnetic substance. As shown in FIG. 17, in a main surface of the disk guide member 86 made of a steel plate, a notch portion 86c is formed at a portion in the vicinity of a passage of the pressing plate 192. Further, although not shown in the drawings, another member, other than the disk guide member 86, has a portion disposed in the vicinity of the passage of the pressing plate 192, the portion being made of a non-magnetic material or being notched. That is, magnetic members are arranged at portions other than a portion in the vicinity of the passage of the pressing plate 192.

As shown in FIGS. 13 and 16, a slide plate 194 is attached to the elongated arm body 189 an upper portion of the latter. The views (a) and (b) of FIG. 31 show the slide plate 194 in detail. The slide plate 194 has, at its one end, an engagement portion 194a, so that slide plate 194 is engageable with a pin 190c projectingly provided on the subarm 190 at the free end portion of the latter. A coil spring 195 is connected to the slide plate 194 as urging means for urging the slide plate 194 to cause the subarm 190 to move to the foregoing second position (where the clamping state of the pressing plate 192 is released).

A rotary lever 196 substantially in the shape of "<" is rotatably provided on the elongated arm body 189 at the other rotary end portion of the latter through a pin 196a. The views (a) through (c) of FIG. 32 show the rotary lever 196 in detail. The rotary lever 196 rotates along a plane parallel to the disk carrying surface 78a of the turntable 79. The rotary lever 196 is pivotally attached at its one rotary end portion on the slide plate 194 at the other end portion of the latter through a pin 196b.

The foregoing elongated arm body 189, the subarm 190, the slide plate 194, the coil spring 195, and the rotary lever 196 are generally referred to as a supporting arm 198. A position of the supporting arm 198 indicated by a two-dotted chain line in FIG. 16, that is, a position where the pressing plate 192 reaches just above the turntable 79, is referred to a clamping position of the supporting arm 198. Another position of the supporting arm 198 indicated by a solid line in FIG. 16, on the other hand, is referred to a non-clamping position of the supporting arm 198. The supporting arm 198 rotates between the clamping and nonclamping positions along a plane parallel to the disk carrying surface 79a of the turntable 79.

Figure 39:
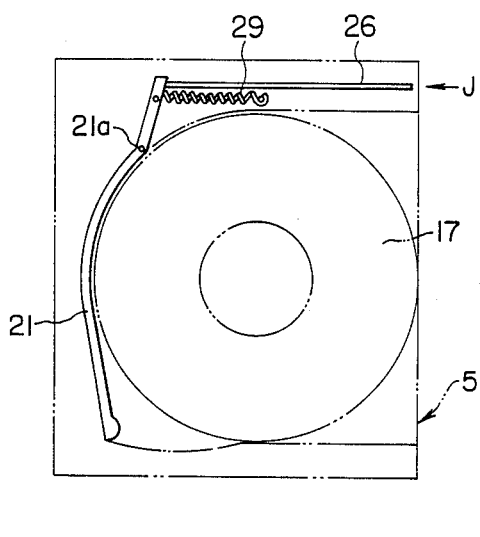
FIGS. 39 through 44 are diagrams showing modifications of the multi-disk player.

As shown in FIG. 16 and the views (a) through (c) of FIG. 39, an adjusting screw 201 is screwed into a side portion of the elongated arm body 189 which is a main constituent member of the supporting arm 198 with the center axis of the adjusting screw 201 made parallel to the longitudinal direction of the elongated arm body 189. As shown in FIGS. 10 and 16, on the other hand, a circular pin 202 engageable with a tip end of the threaded portion of the adjusting screw 201 is projectingly provided on the bracket 186 for supporting the rotary supporting shaft 187. In FIG. 16, however, the bracket is not shown but only the pin 202 is illustrated.

Adjusting means for adjusting a stopping position of the supporting arm 198 at the clamping position is constituted by the adjusting screw 201 and the pin 202. A clamping mechanism for clamping the disk 17 conveyed onto the turntable 79 is constituted by the adjusting means, the supporting arm 198, the rotary supporting shaft 187 for supporting the supporting arm 198, and the pressing plate 192. Further, in the clamping mechanism, an adjusting screw 204 shown in FIG. 16 is provided in addition to the foregoing adjusting screw 201. This adjusting screw 204 is screwed into the elongated arm body 189 in the upward/downward direction, so that the tip end of the adjusting screw engages the free end portion of the subarm 190. It is possible to desirably adjust the angle of swinging of the subarm 190 by fastening/loosening the adjusting screw 204.

As shown in FIGS. 10 and 16, a pin 196c is projectingly provided on the other end of the rotary portion of the rotary lever 196 which is a constituent member of the supporting arm 198, the pin 196c being smoothly fitted into an elongated hole 179i formed in an expanded portion 179h provided at a left end portion of the slide plate 179 and extending, the elongated hole 179i extending in the frontward and rearward directions (the direction of the arrow Y and that opposite to thereto). That is, the leftward (in the direction of the arrow X) movement of this slide plate 179 causes the supporting arm 198 to rotate toward the foregoing clamping position. The movement of the slide plate 179, that is, the rotation of the supporting arm 198, is performed by the movable body 99 through the lever member 176. The movable body 99 further acts to perform the upward/downward movement of the disk carrying portion 85. After the movement of any one of the disk carrying portion 85 and the supporting arm 198 has been performed (in the case of the supporting arm 198, the movement being rotation), the movement of the other is effected.

As shown in FIG. 10 and 12, a pair of detection switches 206 and 207 are provided on the chassis 32 respectively at the front and rear sides of the right end portion of the latter such that the movable body 99 can come into contact with these detection switches 206 and 207. Further, a photo-sensor 208 is provided in opposition to a main surface of the gear 106 for transmitting driving force to the movable body 99.

As shown in FIG. 15, two photo-sensors 211 and 212, and a detection switch 213 are provided on the disk carrying portion 85 at a rear end portion of the latter so as to detect a position of displacement of the movable body 137 (shown also in FIG. 10). Reflection plates to be detected by the photo-sensors 211 and 212 respectively are stuck on the movable body 137.

As shown in FIG. 15, a detection switch 214 is provided at a predetermined position of the supporting member 77 for supporting the turntable 79, etc., so as to detect existence of the carriage 80 carrying the optical pick-up means thereon at a home position, that is, at a stationary position before play-back.

A control section (not shown) is provided at a predetermined position in the housing 2 for controlling the foregoing play-back means (constituted by the turntable 79, and so on), the magazine mounting/demounting mechanism (constituted by the carrying plate 37, the motor 50, and so on), and the disk conveying mechanism.

Respective detection signals generated from the foregoing detection switches 63, 64, 65, 206, 207, 213, and 214, and the foregoing photo-sensors 67, 68, 69, 162, 167, 208, 211 and 212 are transferred to the control section. The motors 50, 82, 108, and 143, and the turntable 79 are respectively operated with predetermined timings described later by the operation signals produced from the control section in response to those detection signals.

The foregoing control section is provided with ejection means for producing a magazine ejection actuating instruction in response to a manual ejection command even during play-back of the disk 17; accommodating portion confirmation means for confirming whether an accommodating portion for accommodating a disk exists in the magazine 5 or not when a disk is to be sent back from the disk carrying portion 85 into the magazine 5; and confirmation means for confirming whether any other disk is being carried on the disk carrying portion 85 or not when a disk is to be projected from the magazine 5 and to be conveyed on the disk carrying portion 85 and for confirming whether an accommodating portion for accommodating the other disk exits in the magazine 5 or not.

Further, the control section is provided with automatic play-back means for automatically performing a play-back sequence including at least two disks unless a stop instruction is produced; disk existence confirmation means for confirming whether a designated disk is accommodated in the magazine 5 or not; and music head detecting means for continuously successively detecting respective music head of musics recorded in a plurarity of disks (for example, three disks) one after one.

Next, referring to FIGS. 33 through 38, the operation of the thus arranged multi-disk player will be briefly described in accordance with the play-back procedure.

Figure 33:
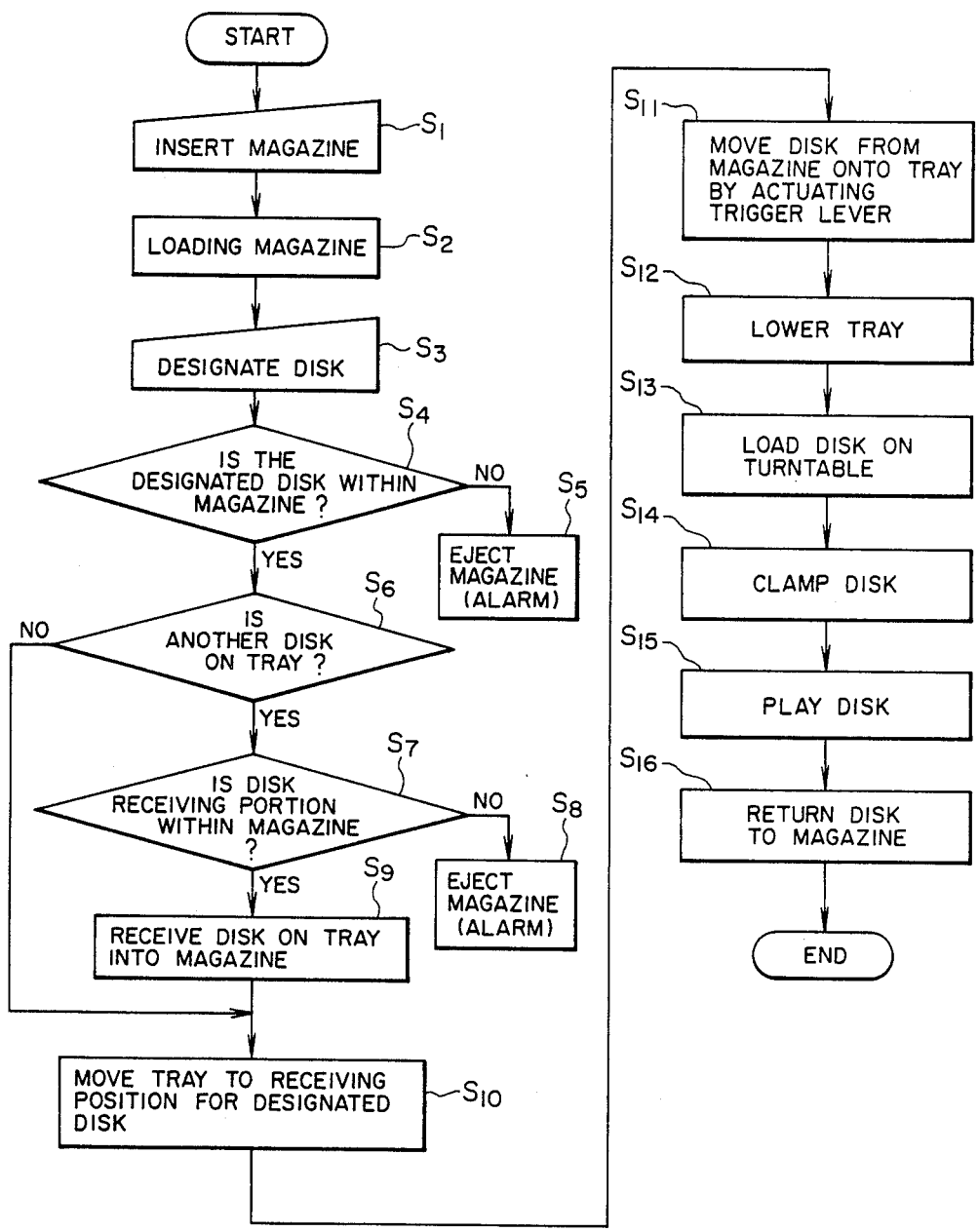
FIGS. 33 through 38 are diagrams for explaining the operations of the multi-disk player.

First, the magazine 5 is inserted into the magazine insertion inlet 3a, as shown in FIG. 1 (the step $S_1$ in FIG. 33). Then, the magazine 5 is carried on the carrying plate 37 shown in FIGS. 7 through 9. In this state, the magazine 5 is somewhat strongly pushed. The pushing against the magazine 5 causes the slide plate 58 provided on the lower surface of the carrying plate 37 to move rearward (in the direction opposite to the arrow Y) by about 3 mm together with the magazine 5 against urging force of the coil spring 59. As a result, the detection switches 63 and 64 are operated to cause the motor 50 to rotate, so that the magazine 5 begins to move rearward together with the movable member 41 and the carrying plate 37. When the movable member 41 has moved rearward by a predetermined distance along the guide shaft 34 so as to cause the rear end portion of the movable member 41 to come into contact with the detection switch 65, the detection switch 65 is operated to stop the motor 50, thus completing the mounting operation of the magazine 5 (the step $S_2$ in FIG. 33).

Next, a predetermined button of the buttons 7 through 10 shown in FIG. 1 is operated to designate a disk as well as a piece of music in the desk to be reproduced (the step $S_3$). At this time, the control section (not shown) confirms whether the designated disk is accommodated in the magazine 5 or not (the step $S_4$). This confirmation is performed by the photo-sensors 67 through 69. If judgement proves that the designated disk does not exist in the magazine 5, this fact is informed to a listener by an alarm, and the magazine 5 is ejected to be exchanged (the step $S_5$), If judgement proves that the desiganted disk is accommodated in the magazine 5, on the other hand, the control section causes the photo-sensor 167 to confirm whether another disk is carried on the disk carrying portion 85 (the disk carrying portion 85 being referred to as "tray" in the flowchart) or not (the step $S_6$), and causes the photo-sensors 67 through 69 to confirm whether an accommodating portion for accommodating the other disk exists in the magazine 5 or not (the step $S_7$). If judgement proves that the other disk is carried on the disk carrying portion 85 (the tray) and the accommodating portion for accommodating this disk does not exist in the magazine 5, the magazine 5 is ejected to be exchanged, and this fact is informed to the listener by an alarm (the step $S_8$). When the accommodating portion for accommodating the other disk exists in the magazine 5, or the magazine 5 is exchanged for another magazine 5 having an accommodating portion, the other disk is accommodated into the magazine 5 by the push-out arm 121 (see FIG. 15) (the step $S_9$).

If judgement proves that the other disk does not exist on the disk carrying portion 85, on the other hand, the disk carrying portion 85 is caused to move to a position where the designated disk 17 is accommodated (the step $S_{10}$). Stoppage of the disk carrying portion 85 at the position where the designated disk is accommodated is performed by the photo-sensors 162 and 212. When the disk carrying portion 85 is stopped, the actuating rod 112 (see FIG. 15, etc.) is projected rightward (in the direction opposite to the arrow X) to thereby actuate the trigger lever 26 (illustrated in FIG. 3) in the magazine 5, so that the disk 17 to be reproduced in projected from the magazine 5 and caused to move onto the disk carrying portion 85 (the step $S_{11}$).

The disk 17 projected from the magazine 5 is located in a predetermined position (just above the turntable 79) on the disk carrying portion 85 by the positioning means constituted by the swing levers 147 and 148 (illustrated in FIG. 15), and when this positioning is confirmed by the photo-sensor 167, the motor 108 (see FIG. 10) rotates to thereby cause the movable body 99 to move frontward (in the direction of the arrow Y) so as to cause the disk carrying portion 85 carrying the disk 17 thereon to come down (step $S_{12}$). In a process in which the disk carrying portion 85 is moved to the lowermost coming-down position, the disk 17 carried on the disk carrying portion 85 is put on the disk carrying surface 79a of the turntable 79 (illustrated in FIG. 10) ($S_{13}$).

The movable body 99 is continuously moved frontward even after the disk carrying portion 85 has reached the lowermost coming-down position to thereby rotate the lever member 176 shown in FIG. 10 counterclockwise in FIG. 10 for the first time. As a result, the slide plate 179 connected to this lever member 176 is moved leftward (in the direction of the arrow X) to thereby actuate the clamping mechanism.

The operation of this clamping mechanism will be described somewhat in detail. First, the slide plate 179 moves leftward (in the direction of the arrow X) to thereby rotate the supporting arm 198 constituting the clamping mechanism, for example, counterclockwise in FIG. 16 about the rotary supporting shaft 187. When the supporting arm 198 is rotated by a predetermined angle to reach the pressing plate 192 just above the turntable 79, the adjusting screw 201 provided on the supporting arm 198 (specifically, on the elonated arm body 189 which is a constituent member of the supporting arm 198) engages the pin 202 to thereby stop the rotation of the supporting arm 198. Thereafter, the slide plate 179 is further moved leftward to thereby rotate the rotary lever 196, which is another constituent member of the supporting arm 198, about the pin 196a, and as a result the slide plate 194 connected to the rotary lever 196 is moved along the elongated arm body 189. As apparent also from FIG. 13, the subarm 190 swings downward to thereby cause the pressing plate 192 to come into contact with the main surface of the disk 17 so as to clamp the disk 17 (the step $S_{14}$).

Further, the slide plate 179 moves leftward (in the direction of the arrow X) to thereby rotate thelever member B 183 shown in FIGS. 10 and 15, the pin 183e of the lever member B 183 engages the link lever 149 to thereby cause the link lever 149 to move frontward (in the direction of the arrow Y). Therefore, the swing levers 147 and 148 positioning the disk 17 on the disk carrying portion 85 are separated from outer peripheral portions of the disk 17 respectively. Further, the lever member B 183 is rotated counterclockwise to thereby push the movable plate 170 (illustrated in FIG. 10) leftward (in the direction of the arrow X) by the expanded portion 183c of the lever member B 183. Therefore, the other swing lever 155 shown in FIG. 15 is separated form an outer peripheral portion of the disk 17. The leftward movement of this movable plate 170 causes the lift lever 171 shown in FIGS. 11 and 15 to rotate counterclockwise in FIG. 11 to thereby cause the disk guide member 86 to swing upward by a predetermined angle. Thus, the disk 17 is put in the state where it can be reproduced, and the turntable 79 and the carriage 80 (illustrated in FIG. 10 and so on) are operated to thereby start the play-back of the disk 17 (the step $S_5$).

When the play-back is ended, the disk 17 is sent back into the magazine 5 (the step $S_{16}$). The operation for sending-back the disk 17 into the magazine 5 is performed in accordance with the procedure which is substantially reverse to the foregoing disk loading operation, and therefore the detailed description is omitted. The operation for pushing the disk 17 carried on the disk carrying portion 85 into the magazine 5, however, is performed by the push-out arm 121 shown in FIG. 15. Further, the control section causes the photo-sensors 67 through 69 to confirm whether an accommodating portion for accommodating the disk 17 to be sent back exists in the magazine 5 or not. As shown in FIG. 15, when the push-out arm 121 is lcoated at a position for pushingout the disk 17, a front end portion of the push-out arm 121 may contact with the magazine 5, however, the notch 5b is formed in this portion so that the operation of the push-out arm 121 is not prevented. The notch portion 5b is shown also in views (a),(d), and (f) of FIG. 2. The listener can take the disk 17 out of the magazine 5 by picking-up the disk 17 between nails of the listener through the notch 5b. The notch 5b is fairly small so that the listener can pick up the disk 17 by only an outer peripheral portion of the disk 17 and there is no risk if damage of the recorded surface of the disk 17 by the nails of the listener.

Thereafter, the foregoing operation is repeatedly performed corresponding to a disk 17 designated. In the case where the magazine 5 is ejected to be exchanged, the cover 6 of the magazine insertion inlet 3a is opened by being pushed by the magazine 5 being ejected.

Figure 34:
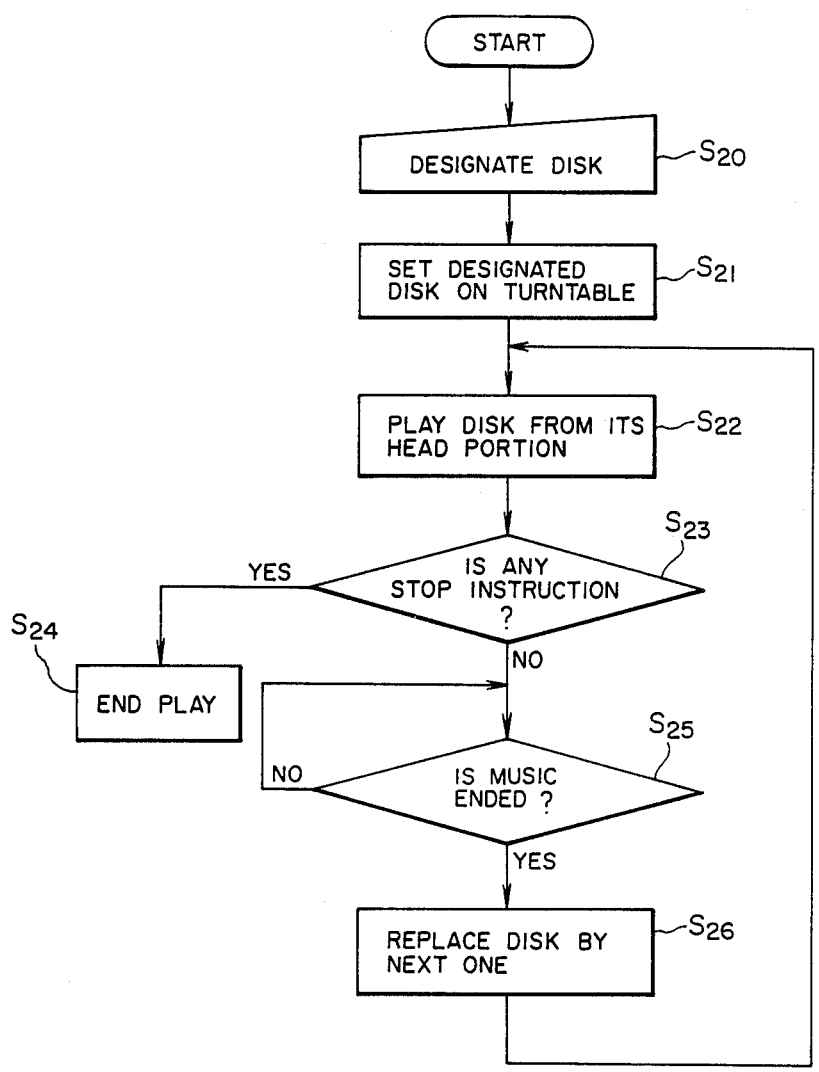

Next, description will be made as to the automatic play-back means for automatically performing a play-back sequence including at least two disks unless a stopping instruction is produced. FIG. 34 shows the case where this automatic play-back means is operated in response to a manual command. First, when a disk to be reproduced is designated (the step $S_2$), this designated disk is conveyed onto the turntable 79 (the step $S_{21}$). The disk is started to be reproduced from a head portion thereof (the step $S_{22}$), and the disk is exchanged for the next disk when the playback of the first disk has been ended. The disk is successively exchanged (the step $S_{26}$), and when play-back of the last one of the designated disks is ended, the first assigned disk is reproduced again. When a play-back stopping button is pushed on the way of this successive play-back, the play-back is ended.

Figure 35:
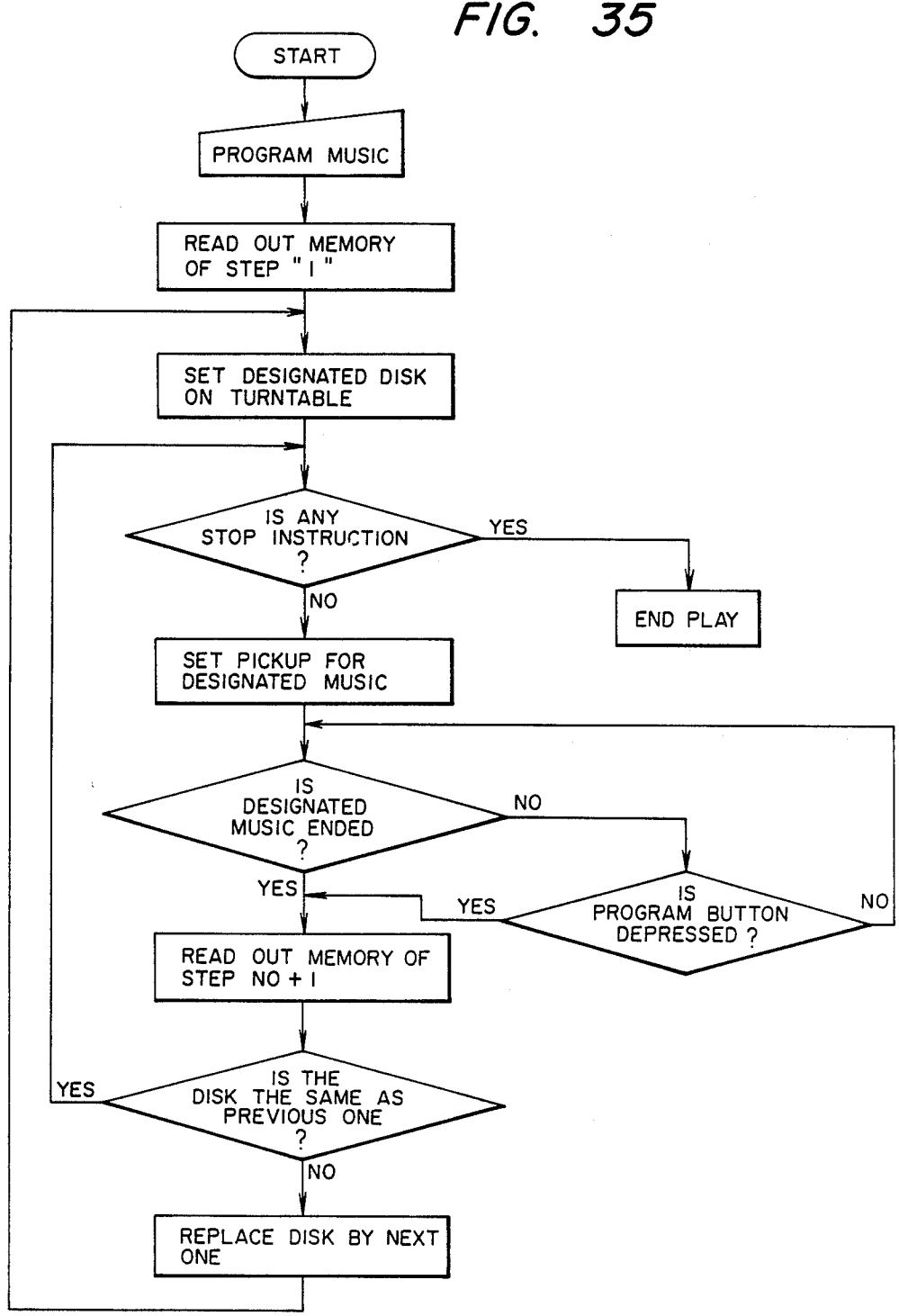

FIG. 35 is a flowchart for explaining the operation of the automatic play-back means in the case where pieces of music are programmed.

Figure 36:
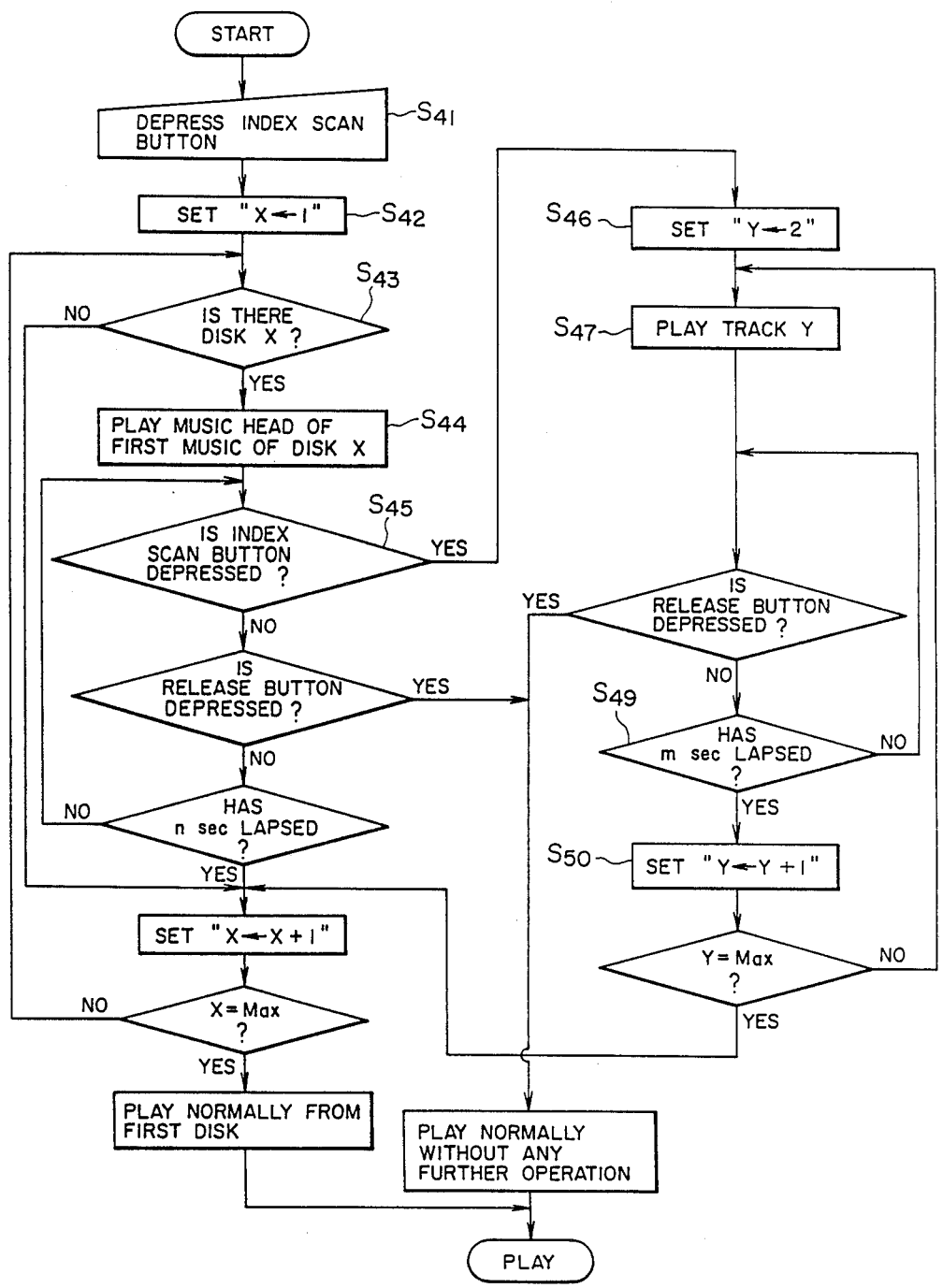

FIG. 36 is a flowchart for explaining the music head detecting means for successively continuously detecting music heads of pieces of music recorded in each of a plurality of disks in the magazine 5. First, when an index scanning button (any one of the buttons 7 through 10), which is a so-called lock button, is depressed, the button is locked in tis pushed state. Then, the number X of a disk to be index-scanned is set to "1", and a music head of the first piece of music in the disk "1" is reproduced (the steps $S_{41}$–$S_{44}$). In this state, that is, in the state where the index scanning button is maintained depressed, music heads of the respective pieces of music following the first piece of music in the disk "1" are successively reproduced (the step $S_{45}$–$S_{50}$). When the play-back of the music heads of the respective pieces of music recorded in the disk "1" have been completed, music heads of respective pieces of music in the respective disks following the disk "1" are successively reproduced. When the play-back of the music heads of the pieces of music in all the disks have been completed, normal play-back is performed for the disk "1". Further, if a RELEASE button is depressed on the way of the play-back of music heads of pieces music, the operation is changed from the rmusic-head play-back mode into the normal playback one.

Figure 37:
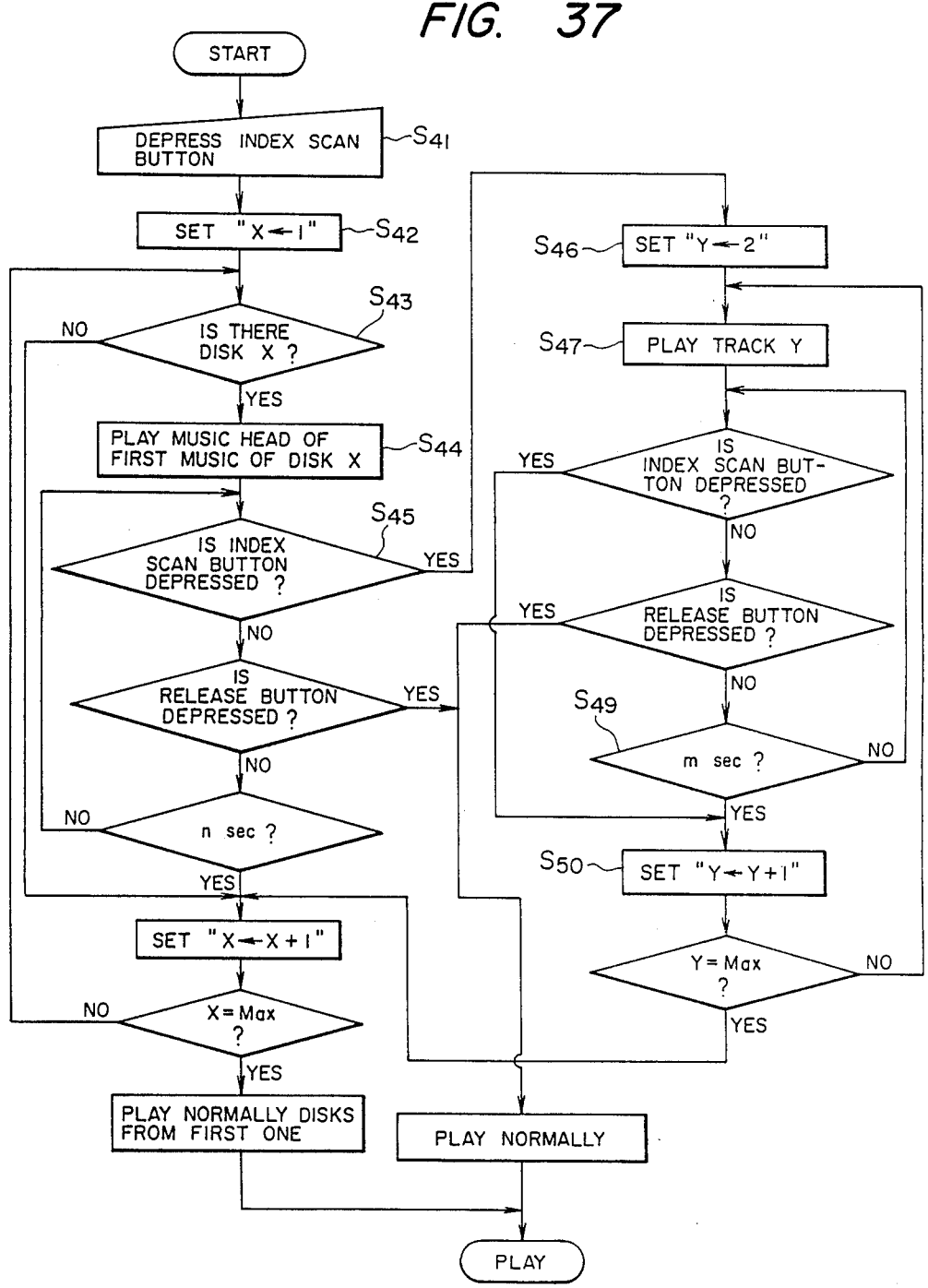
Figure 38:
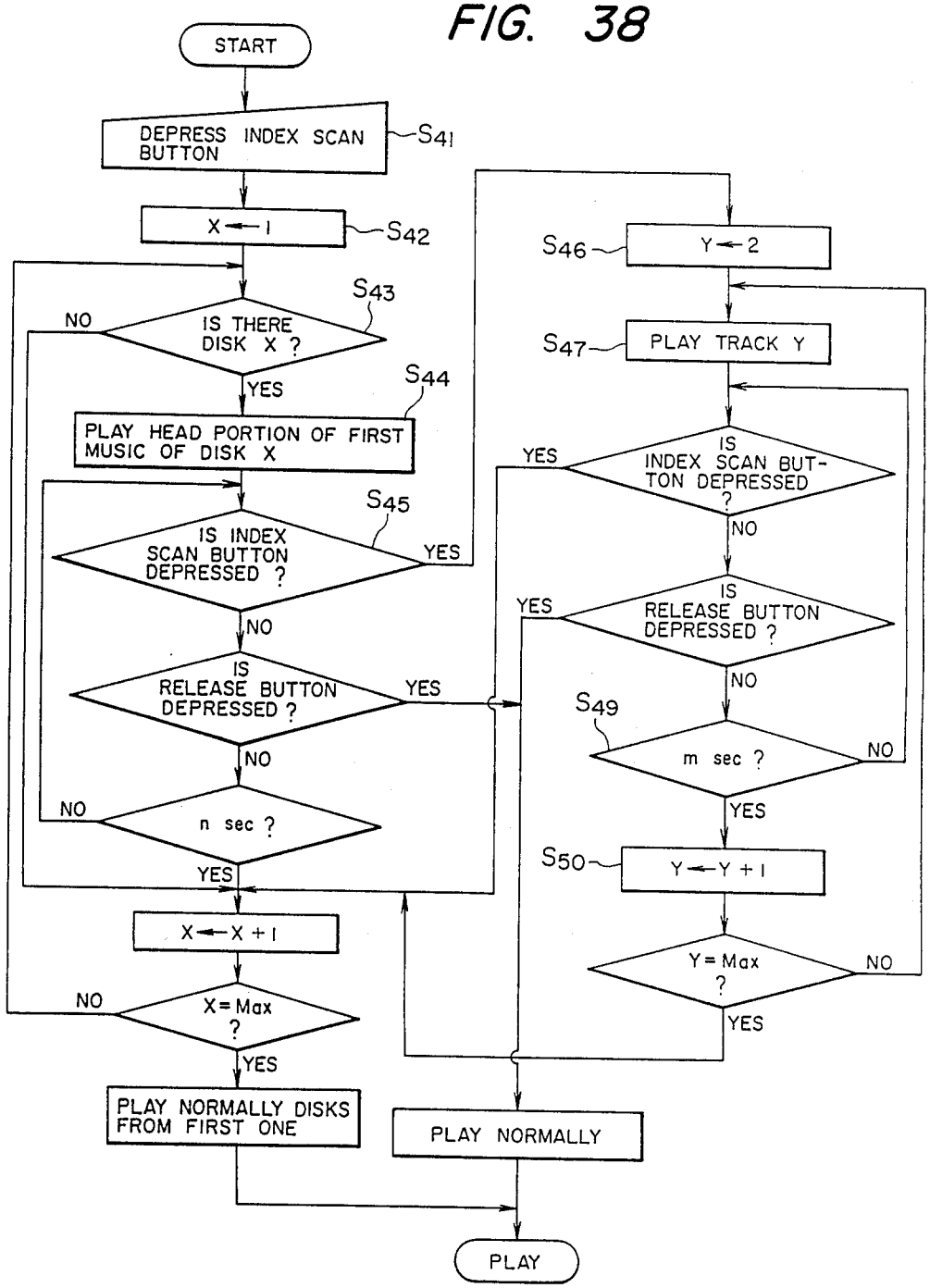

FIGS. 37 and 38 are flowcharts for explaining modifications of the music head detecting means. FIG. 37 is a flowchart for explaining the case where the index scanning button is pushed immediately after a music head of a certain piece of music in a predetermined disk has been reproduced to thereby immediately start play-back of the music head of the next piece of music. FIG. 38 is a flow chart for explaining the case where the index scanning button is pushed immediately after a music head of a certain piece of music in a predetermined disk has been reproduced to thereby release the play-back of music heads in this disk so as to perform play-back of music heads of the first music successively in the disks following the first disk.

Figure 40:
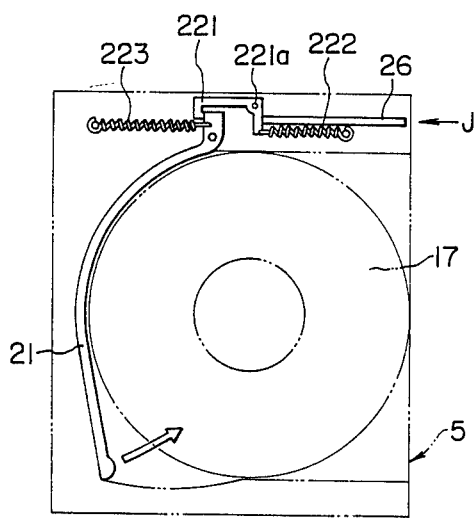

FIGS. 39 through 40 show modifications of the inner construction of the magazine 5. In a magazine 5 shown in FIG. 39, a trigger lever 36 is pushed in the direction of an arrow J to thereby cause a projection arm 21 to swing about a pin 21a against urging force of a coil spring 29 so as to push a disk 17 out of the magazine 5.

In a magazine 5 shown in FIG. 40, a trigger lever 26 is pushed in the direction of an arrow J to thereby rotate a intermediate lever 221 about a pin 221a against bias force of a coil spring 22 so as to cause a projection arm 21 urged by a coil spring 223 to swing about a pin 21a, so that a disk 17 is projected from the magazine 5.

Figure 41:
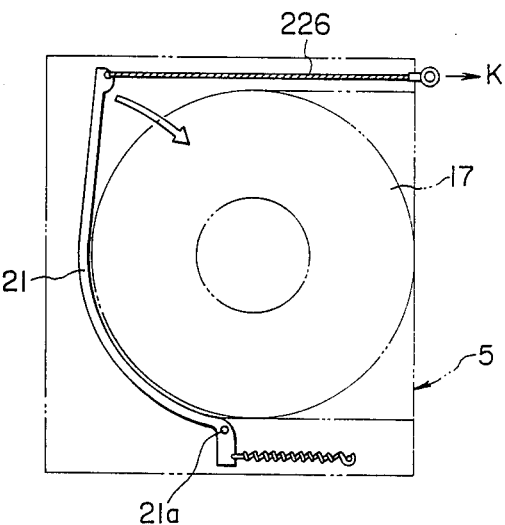

Further, in a magazine 5 shown in FIG. 41, a wire 226 acting as a trigger lever is pulled in the direction of an arrow K to thereby cause a projection arm 21 to swing about a pin 21a against urging force of a coil spring 227 so as to project a disk 17 from the magazine 5.

Figure 42:
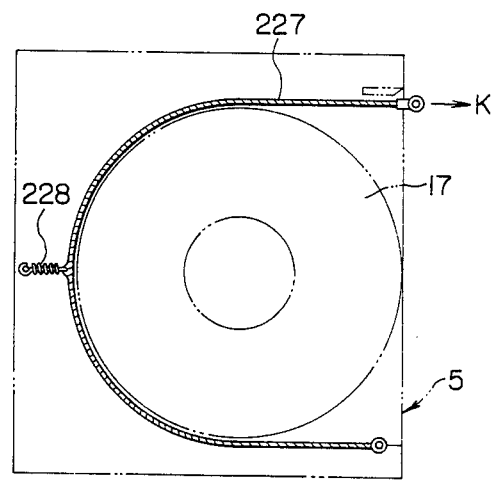

In a magazine 5 shown in FIG. 42, a wire 227 is pulled in the direction of an arrow K against urging force of a coil spring 228 to thereby project a disk 17 from the magazine 5 by the wire 227.

Figure 43:
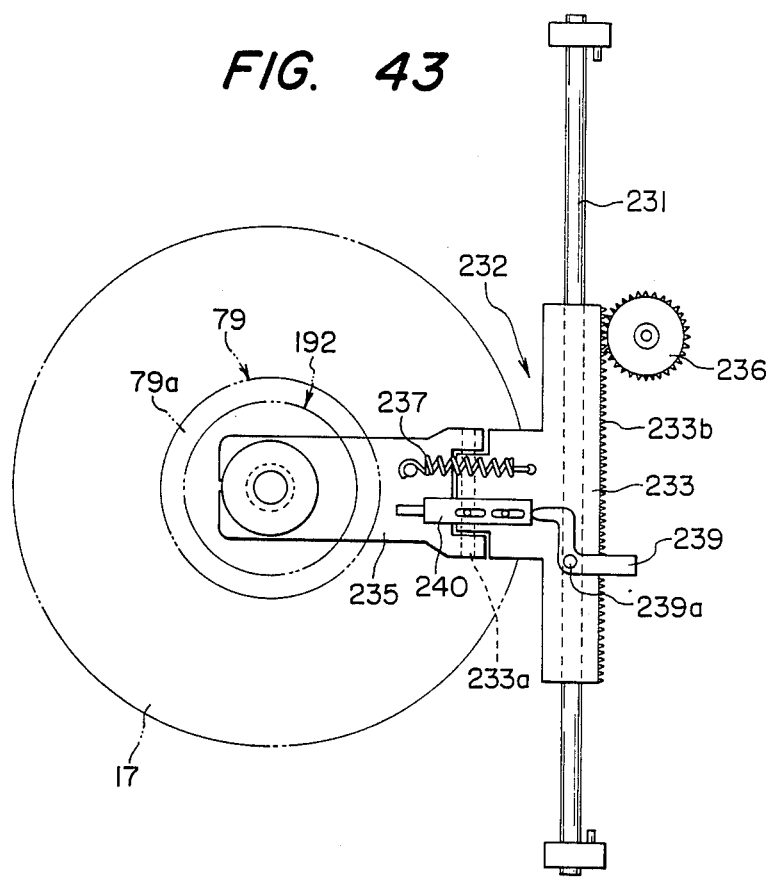
Figure 44:
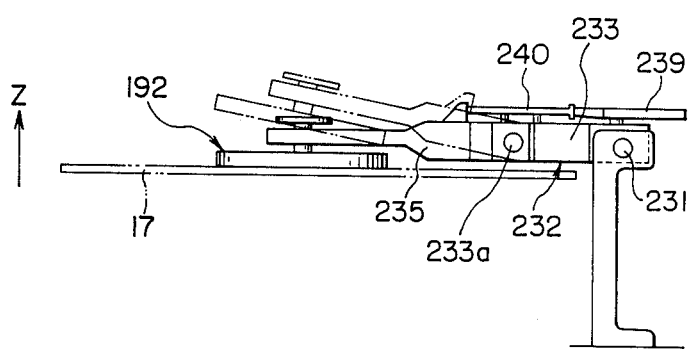

Although the clamping mechanism is arranged such that the pressing plate 192 is moved in parallel to the disk carrying surface 79a of the turntable 79 by the rotation of the supporting arm 198 as shown in FIG. 16, etc., in the foregoing embodiments of the multi-disk player, the present invention is not limited to this arrangement. FIGS. 43 and 44 show another embodiment of the clamping mechanism. As illustrated in the drawings, there is provided a guide shaft 231 extending in parallel to a disk carrying surface 79a of a turntable 79, and a supporting arm 232 is constituted by an arm body 233 arranged to be slidable on the guide shaft 231 and a subarm 235 attached to a front end portion of the arm body 233 through a pin 233a so as to be swingable in the upward and downward directions (the direction of an arrow Z and that opposite thereto), the subarm 235 rotatably supporting at its free end portion a pressing plate 192. A rack portion 233b is formed on the arm body 233 in the direction of movement of the latter, and the arm body 233 is driven by a driving source including a gear 236 geared with the rack portion 233b. A coil spring 237 is interposed between the arm body 233 and the subarm 235, for urging the subarm 235 toward a non-clamping position (a position of the subarm where the pressing plate 192 attached to the subarm 235 separates from a main surface of a disk 17). The subarm 235 is caused to swing through a slider 240 by rotating an actuating lever 239 rotatably provided on the arm body 233 by a pin 239a.

As described above in detail, the multi-disk player according to the present invention comprises: a housing (2); play-back means provided with a turntable (79) and disposed in the housing; a magazine (5) for carrying a plurality of disks (17) so as to be able to move the disks along a main surface of each of the dissk and for accommodating and arranging the disks one by one in the direction substanially perpendicular to a disk carrying surface of the turntable, the magazine being demountably mounted in the housing at a predetermined mounting portion; a magazine mounting/demounting mechanism (constituted by a carrying plate 37, a motor 50, and so on) for mounting/ejecting the magazine onto/from the mounting portion; a disk conveying mechanism for selecting desired ones of the disks in the magazine one by one, and for conveying the selected disks onto the disk carrying surface one by one from the magazine and conveying into the magazine one by one from the disk carrying surface; and a control unit for controlling the play-back means, the magazine mounting/demounting mechanism, and the disk conveying mechanism.

Thus, since the disk layer is provided with a magazine mounting/demounting mechanism for automatically mounting/demounting a magazine into/out of the housing of the player, the operation property with respect to the magazine mounting/ demounting is good and any troublesome feeling is given not at all to a listener.

In the multi-disk player according to the present invention, the disk conveying mechanism including disk projecting/accommodating means (constituted by an actuating rod 112, etc.) for projecting the disk along the main surface thereof to the magazine to cause the magazine to accommodate the disk thereinto, and disk displacing means for displacing the disk in the direction perpendicular to the disk carrying surface and having a disk carrying portion (85) arranged movable in the direction of arrangement of the disks in the magazine for carrying the disk projected from the magazine; and the control unit including ejecting means for generating a magazine ejection instruction in response to a manual ejection command even during play-back of disk, and confirmation means for making confirmation as to whether any other disk is being carried by the disk carrying portion when the disk is projected form the magazine to be conveyed onto the disk carrying portion and for making confirmation as to whether any accommodating portion for accommodating the other disk exists in the magazine. That is, when a desired disk is to be conveyed onto the above-mentioned disk carrying portion in order to reproduce the desired disk, if there is any other disk exists on the disk carrying portion, the other disc left on the disk carrying portion is first accommodated into the above-mentioned magazine, and thereafter a new disk is conveyed onto the disk carrying portion.

Further, in the case where there is no further disk accommodating portion in the magazine for accommodating the disk left on the disk carrying portion, it is possible to eject this magazine and alternatively mount another magazine having a disk accommodating portion for the above-mentioned disk.

Accordingly, it is possible to prevent disks from being inserted at the double and to perform the play-back operation smoothly and surely.

As described above, the multi-disk player according to the present invention comprises a magazine (5) for accommodating and arranging a plurality of disks one by one, disk existence detection means for detecting existence of each of the disk in the magazine, and a disk conveying mechanism for selecting desired ones of the disks in the magazine one by one and for conveying the selecting disks onto the disk carrying surface one by one from the magazine and conveying into the magazine one by one from the disk carrying surface. The magazine includes a disk projecting mechanism for projecting the disk out of the magazine along a main surface of the disk, a holding mechanism for holding the disk at an accommodating position, and a trigger lever (26) for externally actuating the projecting mechanism and the holding mechanism. The disk conveying mechanism includes disk projecting/accommodating means (constituted by an actuating rod 112, etc.) for actuating the trigger lever to project the disk out of the magazine and to accommodate the projected disk into the magazine, and disk displacement means arranged to be movable in the direction of arrangement of the disks and provided with a disk carrying portion (85) for carrying a disk projected out of the magazine, thereby displacing the carried disk in the direction substantially perpendicular to the disk carrying surface of the turn table.

That is, the arrangement is made such that a disk can be projected out of the magazine by merely actuating the trigger lever by the disk projecting/accommodating means constituting a part of the disk conveying mechanism, whereby the displacment of the disk in one of the two directions necessary for conveying the disk onto the turntable (the disk conveyance in the direction parallel to the disk carrying surface of the turntable) is completed. The structure of the disk projecting/accommodating means is very simple and compact because it is sufficient that the means performed only the function, for example, to push the trigger lever. Accordingly, compared with the conventionally developed multi-disk player provided with a disk conveying mechanism of the type in which a desired one of the disks accommodated in the magazine is pull out of the magazine while directly grasping the disk by a complex grasping mechanism by one end of the disk in the projecting direction out of the magazine or by substantially the whole of the disk, the disk conveying mechanism according to the present invention is simple in structure so that the disk player can be easily made compact as a whole and can be reduced in cost.

Further, in the multi-disk player according to the present invention, the trigger lever is biased toward one side with respect to the disk projecting/accommodating direction out of/into the magazine. Accordingly, the disk projecting/accommodating means constituting a part of the disk conveying mechanism is disposed compactly at a side of a disk conveying path, so that the space in the housing of the player can be effectively used and the disk player can be made further compact as a whole.

Furthermore, in the multi-disk player according to the present invention, the disk projecting mechanism is constituted by a plate-like projecting arm (21) swingably provided in the vicinity of the deepest portion of the magazine such that a free end of the arm engages an outer periphery of the disk. The plate-like projecting arm can be produced inexpensively, for example, by applying dieing out processing onto a steel plate, and the attaching work for the arm is simple because the arm performs a simple swinging movement, so that the cost can be reduced easily.

Further, in the multi-disk player according to the present invention, the holding mechanism includes a holding arm (24) rotatably provided for urging the disk toward an accommodating position thereof by one of rotary ends of the holding arm, and urging force application means (coil spring 25) for applying urging force to the holding arm, the other rotary end (24d) of the holding arm being exposed outside a body of the magazine, and the disk existence detecting means includes a sensor (photo sensors 67 through 69) for detecting the other rotary end of the holding arm. Thus, the holding arms constitutes a part of the disk existence detection means and is also used as a body to be detected which moves in accordance with the existence of the disk between a detected position at which the holding arm is detected by the sensor and a non-detected position at which the holding arm is node detected by the sensor. Accordingly, compared with the case where a detected body is provided separately from the holding arm, the number of necessary parts and hence the cost can be reduced. Similarly to the plate-like projecting arm, the holding arm can be produced inexpensively from a steel plate so that the cost can be further reduced.

As described above, the multi-disk player according to the present invention comprises a magazine (15) for accommodating and arranging a plurality of disks (17) one by one, a disk conveying mechanism for selecting desired ones of the disk in the magazine one by one and for conveying the selected disk onto the disk carrying surface one by one from the magazine and conveying into the magazine one by one from the disk carrying surface, and a clamp mechanism for clamping the disk conveyed on the turntable, the clamp mechanism including a pressing member (192) arranged to come into contact with one surface of the disk mounted on the turntable at the other surface of the disk to perform a disk clamping operation in cooperation with the turntable, and a support arm (198) arranged to be movable relative to the turntable between a clamping position and a non-clamping position and for rotatably supporting the pressing member, the supporting arm being movable along a plane parallel to the disk carrying surface.

Accordingly, it is easy to reduce the size in the whole of the disk player and particularly the size in the direction of heigth (the direction perpendicular to the disk carrying surface of the turnable).

What is claimed is:

1. A multi-disk player comprising:
   a housing;
   play-back means provided with a turntable and disposed in said housing;
   a magazine for carrying a plurality of disks and for individually moving said disks in a direction parallel to a main surface of each of said disks and for accommodating and arranging said disks in a stacked manner in a direction perpedicular to said main surface, said magazine being removably mounted on a predetermined mounting portion of said housing;
   a magazine mounting/demounting mechanism for mounting/ejecting said magazine onto/from said mounting portion;
   a disk conveying mechanism for selecting a desired one of said disks in said magazine, and for conveying the selected disk to a disk carrying surface from said magazine and for conveying said selected disk into said magazine from said disk carrying surface;
   a control unit for controlling said play-back means, said magazine mounting/demounting mechanism, and said disk conveying mechanism;
   said disk conveying mechanism including disk projecting/accommodating means for translating the disk in a direction parallel to the main surface thereof into said magazine, and disk displacing means for displacing the disk in the direction perpendicular to said disk carrying surface and having a disk carrying portion movable in said perpendicular direction for supporting the disk projected from said magazine; and
   said control unit including:
   (a) means for generating a magazine ejecting instruction in response to a manual ejection command;
   (b) means for detecting whether a disk is located on said disk carrying portion;
   (c) means for detecting whether said magazine is fully occupied with other said disks and;
   (d) means for generating said magazine ejecting instruction if said magazine is fully occupied with other said disks.

2. A multi-disk player comprising:
   a housing;
   play-back means provided with a turntable and disposed in said housing;

a magazine arranged to be removably mounted on a predetermined mounting portion of said housing and for accommodating and arranging a plurality of disks in a stacked manner;

a disk conveying mechanism for selecting a desired one of said disks in said magazine, and for conveying the selected disk to a disk carrying surface from said magazine and conveying said selected disk into said magazine from said disk carrying surface; and a clamp mechanism for clamping the disk on said turntable, said clamp mechanism including a pressing member arranged to come into contact with one surface of the disk mounted on said turntable at the other surface of the disk to perform a disk clamping operation in cooperation with said turntable, and a support arm arranged to be movable relative to said turntable between a clamping position and a non-clamping position and for rotatably supporting said pressing member, said supporting arm being movable along a plane parallel to said disk carrying surface.

3. A multi-disk play comprising;

a housing;

play-back means provided with a turntable and disposed in said housing;

a magazine arranged to be removably mounted on a predetermined mounting portion of said housing and for accommodating and arranging a plurality of disks in a stacked manner, said magazine including a disk projecting mechansim for projecting the disk out of said magazine in a direction parallel to a main surface of the disk, a holding mechanism for holding the disk, said disk being held in an accommodated position, and a trigger lever for actuating said disk projecting mechanism and said holding mechanism said disk projecting mechanism being comprised of a plate-like projecting arm swingably provided such that a free end of said arm engages an outer periphery of the disk;

said holding mechanism including a holding arm rotatably provided for urging the disk toward a retained position by one end of said holding arm, and a holding force application means for applying holding force to said holding arm, the other end of said holding arm being exposed outside the body of said magazine;

said trigger lever being biased toward one direction with respect to a disk projecting direction;

disk detection means for detecting the existence of each of said disks in said magazine, said disk detecting means including a sensor for detecting said other end of said holding arm;

a disk conveying mechanism for selecting a desired one fo said disks in said magazine, and for conveying the selected disk from said magazine to a disk carrying surface and for conveying said selected disk from said disk carrying surface into said magazine, said disk conveying mechanism including:

(a) projecting/accommodating means for actuating said trigger lever to project the disk out of said magazine and for translating the disk into said magazine; and (b) a disk carrying portion for supporting a disk projected from said magazine; and (c) disk displacement means for moving said disk carrying portion in a direction perpendicular to said disk carrying surface, thereby displacing said carried disk in said perpendicular direction.

* * * * *